(12) United States Patent
Kuelbs

(10) Patent No.: US 8,069,868 B2
(45) Date of Patent: Dec. 6, 2011

(54) UMBRELLA APPARATUS

(75) Inventor: Gregory G. Kuelbs, Westlake, TX (US)

(73) Assignee: World Factory, Inc., Westlake, TX (US)

( * ) Notice: Subject to any disclaimer, the term of this patent is extended or adjusted under 35 U.S.C. 154(b) by 0 days.

(21) Appl. No.: 12/240,845

(22) Filed: Sep. 29, 2008

(65) Prior Publication Data
US 2009/0090404 A1   Apr. 9, 2009

Related U.S. Application Data

(63) Continuation of application No. 10/829,790, filed on Apr. 22, 2004, now abandoned, which is a continuation-in-part of application No. 10/650,537, filed on Aug. 28, 2003, which is a continuation of application No. 10/068,424, filed on Feb. 7, 2002, now Pat. No. 6,612,713.

(60) Provisional application No. 60/267,018, filed on Feb. 7, 2001, provisional application No. 60/335,933, filed on Nov. 2, 2001.

(51) Int. Cl.
*A45B 3/00* (2006.01)
(52) U.S. Cl. .......................... 135/16; 135/20.3
(58) Field of Classification Search .............. 135/16, 135/20.3; 362/102
See application file for complete search history.

(56) References Cited

U.S. PATENT DOCUMENTS

| | | | | |
|---|---|---|---|---|
| 2,863,466 A | * | 12/1958 | Small | 135/20.3 |
| 2,960,094 A | * | 11/1960 | Small | 135/22 |
| 3,129,715 A | * | 4/1964 | Militano et al. | 135/20.3 |
| 3,801,809 A | * | 4/1974 | Slade | 362/134 |
| 3,878,387 A | | 4/1975 | Kovacic | |
| 4,540,929 A | * | 9/1985 | Binkley | 320/104 |
| 4,692,680 A | * | 9/1987 | Sherer | 320/103 |
| 4,893,356 A | * | 1/1990 | Waters | 2/171.3 |
| 4,920,897 A | * | 5/1990 | Reed et al. | 108/150 |
| 5,053,931 A | * | 10/1991 | Rushing | 362/102 |
| 5,055,984 A | | 10/1991 | Hung et al. | |
| 5,116,258 A | * | 5/1992 | Vennik | 135/20.3 |
| 5,126,922 A | | 6/1992 | Andreasen | 362/32 |
| 5,141,010 A | * | 8/1992 | Muller et al. | 135/20.3 |
| 5,172,711 A | | 12/1992 | Mueller et al. | 135/16 |
| 5,273,062 A | | 12/1993 | Mozdzanowski | 135/16 |
| 5,349,975 A | | 9/1994 | Valdner | 135/16 |

(Continued)

FOREIGN PATENT DOCUMENTS
FR    9200638    1/1993
(Continued)

OTHER PUBLICATIONS

Specification dated Feb. 7, 2007 from U.S. Appl. No. 10/068,424.
(Continued)

*Primary Examiner* — Noah Chandler Hawk
(74) *Attorney, Agent, or Firm* — James E. Walton

(57) ABSTRACT

A lawn or patio umbrella with an integral lighting system that utilizes cold cathode ray tubes, light emitting diodes (LED's), or florescent lights, to provide relatively bright outdoor light for reading and other activities that require relatively high light intensities is provided. In one embodiment, a modular, electrically powered lawn or patio umbrella in which lighting systems, such as those utilizing cold cathode tubes, LED's, or florescent lights; cooling systems, such as those utilizing electric fans or misting systems; and motorized retraction systems; can be selectively interchanged is provided.

11 Claims, 28 Drawing Sheets

U.S. PATENT DOCUMENTS

| | | | | | |
|---|---|---|---|---|---|
| 5,373,287 | A | * | 12/1994 | Doublet | 340/825.69 |
| 5,396,162 | A | * | 3/1995 | Brilmyer | 320/114 |
| 5,463,536 | A | | 10/1995 | Chou et al. | 362/102 |
| 5,502,624 | A | * | 3/1996 | Tu | 362/102 |
| 5,584,564 | A | | 12/1996 | Phyle | 362/102 |
| 5,611,614 | A | | 3/1997 | Morgan | |
| 5,664,874 | A | | 9/1997 | Winterer | |
| 5,758,948 | A | | 6/1998 | Hale | |
| 5,819,455 | A | * | 10/1998 | Tsuda | 40/580 |
| 5,911,493 | A | * | 6/1999 | Walker et al. | 362/102 |
| 5,937,882 | A | * | 8/1999 | Harbaugh | 135/20.3 |
| 5,954,417 | A | * | 9/1999 | Mai | 362/102 |
| 5,957,717 | A | | 9/1999 | Monsef et al. | |
| 6,017,188 | A | | 1/2000 | Benton | 416/5 |
| 6,018,231 | A | * | 1/2000 | Shaver et al. | 320/116 |
| 6,058,951 | A | * | 5/2000 | Wilson | 135/22 |
| 6,089,727 | A | * | 7/2000 | Wu | 362/102 |
| 6,126,293 | A | * | 10/2000 | Wu | 362/102 |
| 6,182,917 | B1 | | 2/2001 | Lai | |
| 6,196,242 | B1 | * | 3/2001 | Xu | 135/20.1 |
| 6,270,230 | B1 | * | 8/2001 | Mai | 362/102 |
| 6,280,874 | B1 | | 8/2001 | Hensley et al. | |
| 6,298,866 | B1 | | 10/2001 | Molnar | |
| 6,299,325 | B1 | * | 10/2001 | Cathel | 362/183 |
| 6,341,873 | B1 | * | 1/2002 | Yang | 362/102 |
| 6,406,163 | B1 | | 6/2002 | Yang | |
| 6,439,249 | B1 | * | 8/2002 | Pan et al. | 135/16 |
| 6,499,856 | B2 | * | 12/2002 | Lee | 362/102 |
| 6,666,224 | B2 | * | 12/2003 | Lee | 135/16 |
| 6,729,742 | B2 | | 5/2004 | Wismeth et al. | |
| 7,051,744 | B2 | * | 5/2006 | Hung | 135/20.3 |
| 7,188,633 | B2 | * | 3/2007 | Zerillo | 135/20.3 |
| 2002/0078985 | A1 | | 6/2002 | Farr | |
| 2005/0072451 | A1 | | 4/2005 | Vivian et al. | |

FOREIGN PATENT DOCUMENTS

| | | | | |
|---|---|---|---|---|
| JP | | 09163479 A | * | 6/1997 |
| JP | | 09168415 | | 6/1997 |

OTHER PUBLICATIONS

Office Action dated Dec. 9, 2002 from U.S. Appl. No. 10/068,424.
Amendment dated Feb. 17, 2003 from U.S. Appl. No. 10/068,424.
Notice of Allowance dated Jun. 20, 2003 from U.S. Appl. No. 10/068,424.
Amendment dated Jun. 3, 2003 from U.S. Appl. No. 10/068,424.
Issue Notification dated Sep. 2, 2003 from U.S. Appl. No. 10/068,424.
Patent No. 6,612,713 from U.S. Appl. No. 10/068,424.
Specification dated Feb. 7, 2002 from U.S. Appl. No. 10/650,537.
Preliminary Amendment dated Aug. 28, 2003 from U.S. Appl. No. 10/650,537.
Publication dated Aug. 5, 2004 from U.S. Appl. No. 10/650,537.
Non-Final Office Action dated Aug. 11, 2004 from U.S. Appl. No. 10/650,537.
Amendment dated Oct. 22, 2004 from U.S. Appl. No. 10/650,537.
Notice of Non-Compliant Amendment dated Nov. 5, 2004 from U.S. Appl. No. 10/650,537.
Response to Notice of Non-Compliant Amendment dated Nov. 15, 2004 from U.S. Appl. No. 10/650,537.
First Restriction Requirement Office Action dated Feb. 17, 2005 from U.S. Appl. No. 10/650,537.
Response to First Restriction Requirement dated Mar. 15, 2005 from U.S. Appl. No. 10/650,537.
Second Restriction Requirement Office Action dated Jun. 10, 2005 from U.S. Appl. No. 10/650,537.
Response to Second Restriction Requirement dated Jun. 29, 2005 from U.S. Appl. No. 10/650,537.
Non-Final Office Action dated Sep. 21, 2005 from U.S. Appl. No. 10/650,537.
Amendment dated Dec. 21, 2005 from U.S. Appl. No. 10/650,537.
Response to Non-Compliant Amendment dated Jan. 13, 2006 from U.S. Appl. No. 10/650,537.
Final Office Action dated Mar. 29, 2006 from U.S. Appl. No. 10/650,537.
Request for Continued Examination dated Aug. 3, 2006 from U.S. Appl. No. 10/650,537.
Non-Final Office Action dated Oct. 20, 2006 from U.S. Appl. No. 10/650,537.
Declaration dated Mar. 19, 2007 from U.S. Appl. No. 10/650,537.
Amendment dated Mar. 19, 2007 from U.S. Appl. No. 10/650,537.
Non-Final Office Action dated Jun. 8, 2007 from U.S. Appl. No. 10/650,537.
Amendment dated Dec. 10, 2007 from U.S. Appl. No. 10/650,537.
Final Office Action dated Mar. 18, 2008 from U.S. Appl. No. 10/650,537.
Request for Continued Examination dated Sep. 18, 2008 from U.S. Appl. No. 10/650,537.
Non-Final Office Action dated Dec. 15, 2008 from U.S. Appl. No. 10/650,537.
Notice of Appeal dated May 13, 2009 from U.S. Appl. No. 10/650,537.
Appeal Brief dated May 13, 2009 from U.S. Appl. No. 10/650,537.
Notice of Non-Compliant Appeal Brief dated Jul. 6, 2009 from U.S. Appl. No. 10/650,537.
Appeal Brief dated Jul. 7, 2009 from U.S. Appl. No. 10/650,537.
Notice of Non-Compliant Appeal Brief dated Oct. 20, 2009 from U.S. Appl. No. 10/650,537.
Notice of Withdrawal of Previous Office Action dated Nov. 3, 2009 from U.S. Appl. No. 10/650,537.
Specification dated Feb. 7, 2007 from U.S. Appl. No. 11/199,956.
Preliminary Amendment dated Aug. 9, 2005 from U.S. Appl. No. 11/199,956.
Request for Continuation Application dated Aug. 9, 2005 from U.S. Appl. No. 11/199,956.
Notice to Correct Application Papers dated Sep. 2, 2005 from U.S. Appl. No. 11/199,956.
Reply to Notice to Correct Application Papers Sep. 15, 2005 from U.S. Appl. No. 11/199,956.
Publication dated Jan. 12, 2006 from U.S. Appl. No. 11/199,956.
Withdrawal of Previous Notice dated Jun. 5, 2007 from U.S. Appl. No. 11/199,956.
Non-Final Office Action dated Jun. 5, 2007 from U.S. Appl. No. 11/199,956.
Amendment dated Dec. 5, 2007 from U.S. Appl. No. 11/199,956.
Non-Final Office Action dated Mar. 3, 2008 from U.S. Appl. No. 11/199,956.
Request for Continued Examination dated Sep. 2, 2008 from U.S. Appl. No. 11/199,956.
Non-Final Office Action dated Nov. 7, 2008 from U.S. Appl. No. 11/199,956.
Notice of Appeal dated Feb. 3, 2009 from U.S. Appl. No. 11/199,956.
Appeal Brief dated Apr. 3, 2009 from U.S. Appl. No. 11/199,956.
Examiner's Answer dated Sep. 17, 2009 from U.S. Appl. No. 11/199,956.
Reply Brief dated Sep. 8, 2009 from U.S. Appl. No. 11/199,956.
Specification dated Feb. 7, 2002 from 95/000,104.
Request for Reexamination dated Sep. 2, 2003 from 95/000,104.
Notice of Assignment dated Aug. 12, 2005 from 95/000,104.
Decision for Granting Reexamination dated Sep. 28, 2005 from 95/000,104.
First Office Action dated Oct. 3, 2005 from 95/000,104.
Response to Order Granting Reexamination dated Nov. 8, 2005 from 95/000,104.
Notice to Correct Papers dated Dec. 5, 2005 from 95/000,104.
Response to Notice to Correct Papers dated Dec. 12, 2005 from 95/000,104.
Requester's Comments dated Dec. 15, 2005 from 95/000,104.
Requester's Comments dated Jan. 16, 2006 from 95/000,104.
Second Office Action dated Dec. 5, 2006 from 95/000,104.
Declaration dated Feb. 5, 2007 from 95/000,104.
Response to Second Office Action dated Feb. 5, 2007 from 95/000,104.
Requesters Response to Second Office Action dated May 7, 2007 from 95/000,104.
Notice to Correct Papers dated Jul. 25, 2008 from 95/000,104.
Response to Notice to Correct Papers dated Aug. 21, 2008 from 95/000,104.

Notice to Correct Papers dated Mar. 20, 2009 from 95/000,104.
Requester's Change of Address dated May 31, 2009 from 95/000,104.
Response to Notice to Correct Papers dated Apr. 17, 2009 from 95/000,104.
Requester's Response dated May 18, 2009 from 95/000,104.
Office Action Rejecting Requester's Response dated Aug. 28, 2009 from 95/000,104.
Requester's Replacement Comments dated Sep. 16, 2009 from 95/000,104.
Office Action Expunging Requester's Comments dated Oct. 22, 2009 from 95/000,104.
Petition Under 37 CFR 1.181 to Find the Third Party Requester's Replacement Comments in Compliance with 37 CFR 1.948 dated Nov. 16, 2009 from 95/000,104.
Petition Under 37 CFR 1.181 to Enter the Third-Party Requester's Replacement Comments on the Basis of the Examiner's Noncompliance with MPEP 2617 dated Nov. 16, 2009 from 95/000,104.
Petition Under 37 CFR 1.181 to Enter Third Party Requester's Replacement Comments for Failure of the Examiner to Comply with MPEP 2667 dated Nov. 16, 2009 from 95/000,104.
Petition Under 37 CFR 1.183 to Suspend the Rules with Respect to the 50-page Limit for Requester's Comments dated Nov. 16, 2009 from 95/000,104.
Petition Under 37 CFR 1.181 to Enter Third Party Requester's Replacement Comments Because the 50-page Limit has Been Properly Met dated Nov. 16, 2009 from 95/000,104.
Specification dated Oct. 21, 2008 from U.S. Appl. No. 12/255,255.
Notice to File Missing Parts dated Nov. 7, 2008 from U.S. Appl. No. 12/255,255.
Response to File Missing Parts dated Nov. 19, 2008 from 12/255,255.
Publication dated Mar. 5, 2009 from U.S. Appl. No. 12/255,255.
Non-Final Office Action dated Aug. 7, 2009 from U.S. Appl. No. 12/255,255.
Amendment dated Nov. 6, 2009 from U.S. Appl. No. 12/255,255.
Specification dated Apr. 22, 2008 from U.S. Appl. No. 10/829,790.
Notice to File Missing Parts dated Jun. 30, 2004 from U.S. Appl. No. 10/829,790.
Response to File Missing Parts dated Aug. 24, 2004 from U.S. Appl. No. 10/829,790.
Preliminary Amendment dated Feb. 23, 2005 from U.S. Appl. No. 10/829,790.
Restriction Requirement dated Mar. 15, 2006 from U.S. Appl. No. 10/829,790.
Response to Restriction Requirement dated Aug. 21, 2006 from U.S. Appl. No. 10/829,790.
Non-Final Office Action dated Nov. 7, 2006 from U.S. Appl. No. 10/829,790.
Declaration dated Apr. 3, 2007 from U.S. Appl. No. 10/829,790.
Amendment dated Apr. 3, 2007 from U.S. Appl. No. 10/829,790.
Non-Final Office Action dated Jul. 23, 2007 from U.S. Appl. No. 10/829,790.
Amendment dated Jan. 23, 2008 from U.S. Appl. No. 10/829,790.
Final Office Action dated Mar. 27, 2008 from U.S. Appl. No. 10/829,790.
Notice of Abandonment dated Dec. 15, 2008 from U.S. Appl. No. 10/829,790.
Reply Brief dated Feb. 9, 2010 from U.S. Appl. No. 10/650,537.
Examiner's Answer dated Dec. 9, 2009 from U.S. Appl. No. 10/650,537.
Action Closing Prosecution dated Dec. 18, 2009 from 95/000,104.
Amendment dated Jan. 18, 2010 from 95/000,104.
Decision on Petitions dated Mar. 2, 2010 from 95/000,104.
Action Closing Prosecution dated Mar. 2, 2010 from 95/000,104.
Response to Action Closing Prosecution dated Mar. 9, 2010 from 95/000,104.
Right of Appeal Notice dated Jan. 12, 2011 from corresponding Patent Reexamination Application/Control No. 95/000,104.
Notice of Appeal of Third Party Requester dated Feb. 10, 2011 from corresponding Patent Reexamination Application/Control No. 95/000,104.
Appeal Brief of Appellant Third Party Requester dated Apr. 8, 2011 from corresponding Patent Reexamination Application/Control No. 95/000,104.

* cited by examiner

UMBRELLA APPARATUS

This application is a continuation of U.S. application Ser. No. 10/829,790, filed 22 Apr. 2004, now abandoned titled "Umbrella Apparatus," which is a continuation-in-part of U.S. application Ser. No. 10/650,537, filed 28 Aug. 2003, titled "Umbrella Apparatus," which is a continuation of U.S. application Ser. No. 10/068,424, filed 7 Feb. 2002, titled "Umbrella Apparatus," which issued on 2 Sep. 2003 under U.S. Pat. No. 6,612,713, which claims the benefit of U.S. Provisional Application No. 60/267,018, filed 7 Feb. 2001, titled "Lighted Patio Umbrella Apparatus," and of U.S. Provisional Application No. 60/335,933, filed 2 Nov. 2001, titled "Outdoor Lighting Systems with Cold Cathode Tubes."

BACKGROUND OF THE INVENTION

1. Field of the Invention

The present invention relates in general to patio umbrellas, and in particular, to an improved patio umbrella with integral lighting system and other modular electronic systems and components.

2. Description of the Prior Art

There has been a recent increase in the interest in entertaining in a lawn and garden environment. Patio furniture is quite popular and useful for outdoor entertaining, especially in portions of the country that have warmer climates. However, the sun often presents an impediment to such outdoor entertaining. Consequently, sales have increased for relatively large patio and table umbrellas for use in shielding or shading table areas and people sitting around the tables from direct exposure to the sunlight. Given the relatively high degree of interest in patio umbrellas, it is likely that improved umbrellas, or umbrellas with enhanced functions, will be well received in the marketplace.

SUMMARY OF THE INVENTION

It is one objective of the present invention to provide a lawn or patio umbrella with an integral lighting system that utilizes cold cathode tubes, light emitting diodes (LED's), or florescent lights, to provide relatively bright outdoor light for reading and other activities that require relatively high light intensities.

It is another objective of the present invention to provide an a lawn or patio umbrella with an integral lighting system that utilizes cold cathode tubes, LED's, or florescent lights, to provide relatively bright outdoor light, and its own rechargeable power supply, including solar cells.

It is yet another objective of the present invention to provide a lawn or patio umbrella with an integral lighting system that utilizes cold cathode tubes, LED's, or florescent lights, to provide relatively bright outdoor light, and a motorized retraction system that aids in opening and closing the umbrella.

It is yet another objective of the present invention to provide a lawn or patio umbrella with an integral lighting system that utilizes cold cathode tubes, LED's, or florescent lights, to provide relatively bright outdoor light, and a cooling system, such as one that utilizes electric fans or misting systems.

It is yet another objective of the present invention to provide a modular, electrically powered lawn or patio umbrella in which lighting systems, such as those utilizing cold cathode tubes, LED's, or florescent lights; cooling systems, such as those utilizing electric fans or misting systems; and motorized retraction systems; can be selectively interchanged.

The above objects are achieved, for example, by integrating a rechargeable power system, a lighting system, a motorized retraction system, and/or a cooling system into a relatively large patio umbrella. The resulting umbrella does not have to be connected to a household electrical system, is a relatively low power consuming device, does not generate much heat, provides a high amount of light intensity, reduces the overall energy consumption of outdoor lighting, allows for fewer batteries to be utilized in each lighting fixture, allows for easier recharging of the batteries due to the lower power requirements, and allows the utilization of smaller photovoltaic solar cells.

In the embodiment that utilizes a cold cathode tube, one additional advantage is that the cold cathode tube may be operated at multiple voltage levels to provide differing amounts of light output. In one particular embodiment, a wireless receiver and transmitter pair may be utilized to allow an operator to use a wireless command signal to change the operating state of the lighting system, such as switching the system between an on and off condition, and switching the system between varying levels of light output. Accordingly, an operator may intensify the light output from the lighting system through use of a wireless handheld transmitter when he wants additional light from a particular umbrella.

BRIEF DESCRIPTION OF THE DRAWINGS

The novel features believed characteristic of the invention are set forth in the appended claims. However, the invention itself, as well as a preferred mode of use and further objectives and advantages thereof, will best be understood by reference to the following detailed description of the preferred embodiment when read in conjunction with the following drawings.

DETAILED DESCRIPTION OF THE INVENTION

Figure 1:
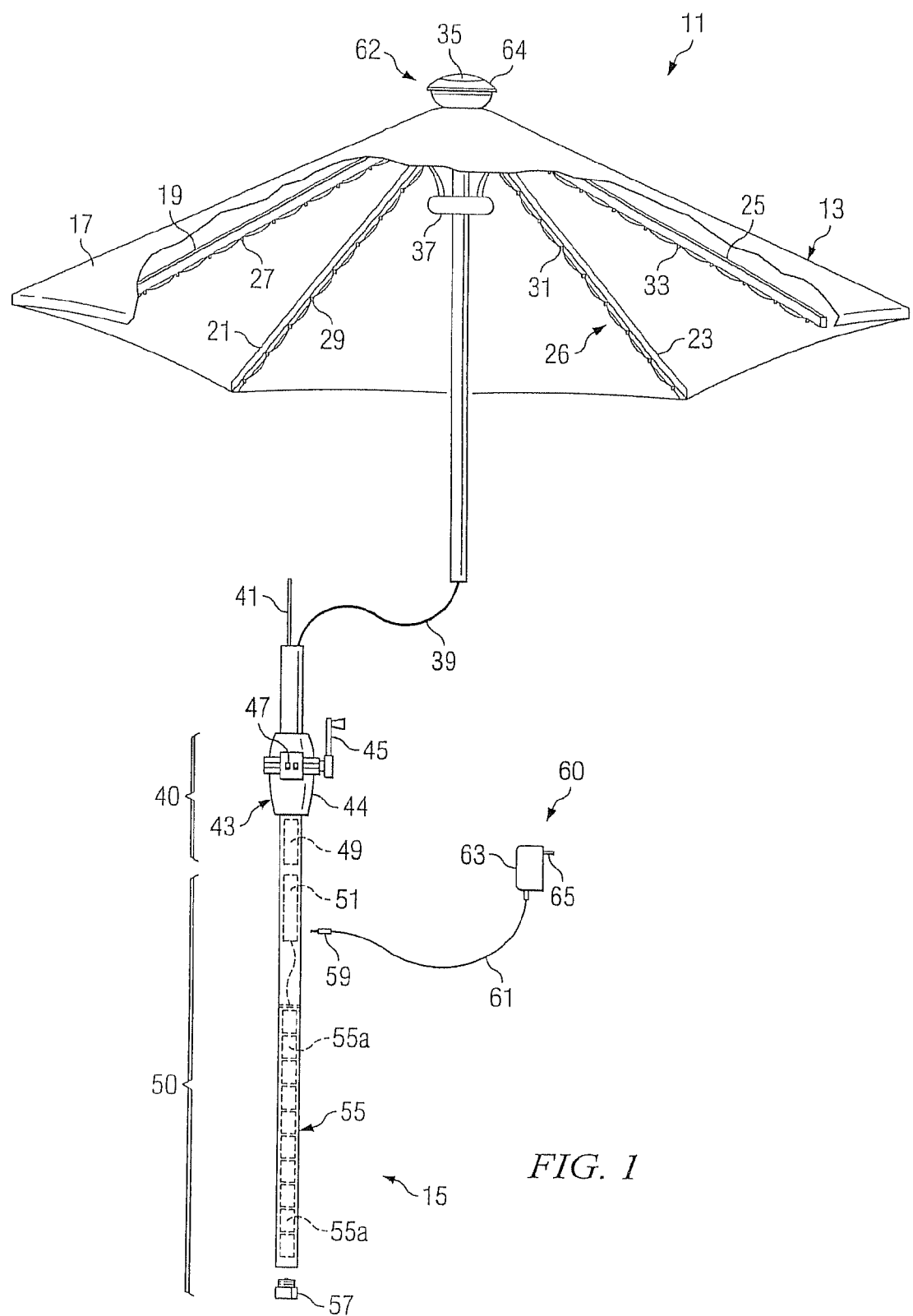
FIG. 1 is a fragmentary and sectional view of the preferred embodiment of the lighted umbrella with motorized opening and closing system according to the present invention.

Referring to FIG. 1 in the drawings, one embodiment of an umbrella apparatus according to the present invention is illustrated. Umbrella apparatus 11 includes an umbrella portion 13 and a hollow tubular pole portion 15. Pole portion 15 is coupled to and supports umbrella portion 13. Umbrella portion 13 is preferably retractable and may be moved between a raised, or expanded open position, which is shown; and a lowered, or retracted, closed position in which umbrella portion is collapsed down about pole portion 15, as is conventional. A flexible canopy 17 is attached to and covers umbrella portion 15. Canopy 17 is supported by a plurality of rib members 19, 21, 23, and 25. Rib members 19, 21, 23, and 25 are preferably hingedly coupled to pole portion 15 at an upper portion of pole portion 15. An integral lighting system 26 is carried by at least one of rib members 19, 21, 23, or 25. Lighting system 26 provides high intensity light to umbrella apparatus 11 and the surrounding area. In the embodiment of FIG. 1, lighting system 26 preferably utilizes a cold cathode tube which will be described in greater detail herein.

Umbrella apparatus 11 may include a base member adapted to receive pole portion 15 and to support umbrella apparatus 11 in a generally upright position. Although not shown in the embodiment FIG. 1, other embodiments of the present invention depict a variety of conventional and novel base members, any of which may be utilized with the embodiment of FIG. 1. It should be understood that in all of the embodiments of the present invention discussed herein, umbrella apparatus 11 may be used with little or no base member whatsoever, provided there is a table or some other support structure, including the ground, which may be adapted to receive pole portion 15. For example, many patio tables are designed with central apertures to receive, support, and stabilize relatively large umbrellas. In some cases, the patio tables eliminate the need for a base member all together.

In accordance with the preferred embodiment of the present invention, light system 26 includes a plurality of light strands 27, 29, 31, and 33 attached to rib members 19, 21, 23, and 25. Each light strand 27, 29, 31, and 33 includes electrical wiring 39 which conductively connects a plurality of small cold cathode tube light bulbs together for providing the high intensity light under canopy 17 and in the area surrounding umbrella apparatus 11. A wiring ring 37 secures and locates electrical wiring 39 of light strands 27, 29, 31, and 33, so that electrical wiring 39 may be passed through the hollow interior of pole portion 15 to a power source, as will be described in detail below.

Umbrella apparatus 11 includes an optional opening and closing system 40 that aids in expanding umbrella portion 13 into the open condition and retracting umbrella portion 13 into the closed condition. Opening and closing system 40 includes a cable system 41, a gear and pulley system 43 housed in a crank case 44, and a manual crank 45. Crank case 44 is preferably located on pole portion 15 such that crank case 44 is accessible when umbrella portion 13 is in the fully retracted position against pole portion 15. Cable system 41 is coupled between rib members 19, 21, 23, and 25 and gear and pulley system 43, and is preferably disposed within the hollow interior of pole portion 15. Manual crank 45 is coupled to gear and pulley system 43 so as to allow manual opening and closing of umbrella portion 13.

Opening and closing system 40 may be automated by the inclusion of an electric screw driver motor 49, or other similar relatively small diameter motor assembly, and one or more operational switches 47. Motor 49 is preferably disposed within the hollow interior of pole portion 15 and is coupled to gear and pulley system 43. Operational switches 47 are preferably carried by crank case 44, and include one or more switches for controlling the operation of motor 49. With the inclusion of motor 49, a user may expand and retract umbrella portion 13 simply by pressing the appropriate operational switch 47. This feature is particularly advantageous when used with large umbrellas which may be relatively heavy and awkward to operate, or when the user lacks sufficient strength to expand or retract umbrella portion 13.

Umbrella apparatus 11 includes a power system 50 having a power source 55. In this embodiment, power source 55 is preferably disposed in the hollow interior of pole portion 15 at a lower extremity and comprises one or more rechargeable batteries 55a. A releasable end cap 57 having integral ground connectors is provided at the lowermost portion of pole portion 15 to complete the electrical circuit of power system 50 and to allow access to rechargeable batteries 55a, as rechargeable batteries 55a may have to be periodically replaced. Power system 50 provides electrical power to lighting system 26 and opening and closing system 40. An external power system charger 51 is electrically coupled to power system 50 to aid in repeatedly charging rechargeable batteries 55a. As is shown in FIG. 1, an external adapter 60 may be provided. External adapter 60 includes a relatively small plug 59 that is adapted to be conductively received by external power system charger 51, an extension cord 61, an electrical transformer 63, and terminals 65 that allow transformer 63 to be plugged into a conventional AC wall outlet. This allows power system charger 51 to receive power directly from a conventional AC wall outlet in order to recharge rechargeable batteries 55a.

In accordance with a preferred embodiment of the present invention, an alternative power system charger 62 may be provided. Alternate power system charger 62 includes at least one solar cell 35 carried by an upper cap portion 64. Solar cells 35 are conductively coupled to power system charger 51 via wires (not shown) that pass through the hollow interior of pole portion 15, thereby allowing solar cells 35 to provide an electrical charge to recharge rechargeable batteries 55a, provided sunlight falls upon solar cells 35. Because solar cells 35 provide continuous recharging throughout the daylight hours, the amount and frequency of charging power system 50 with external power system charger 60 may be minimized. It is important to note that locating alternate power system charger 62 atop umbrella portion 13 is unique and advantageous, particularly when alternate power system charger 62 includes solar cells 35 or other types of solar energy collectors. Such location limits the visibility of alternate power system charger 62 and ensures that solar energy collection is maximized.

The embodiment depicted in FIG. 1 is advantageous over the prior art in that it provides a number of useful functions. Umbrella apparatus 11 is lighted by lighting system 26 which does not require continuous access to a conventional AC wall outlet, while providing high intensity light. This allows umbrella apparatus 11 to be placed in a relatively remote lawn or garden locations that are away from, or substantially removed from, conventional AC power outlets. During daylight hours, solar cells 35 provide a continuous trickle charge to recharge rechargeable batteries 55a, thereby reducing the need for and frequency of use of external power system charger 60. However, when an electrical charge is needed, external power system charger 60 may be utilized to directly charge power system charger 51. Of course, a conventional extension cord may be used, thereby eliminating the need to move umbrella apparatus 11 from its remote location to a location near an AC power outlet.

Figure 2A:
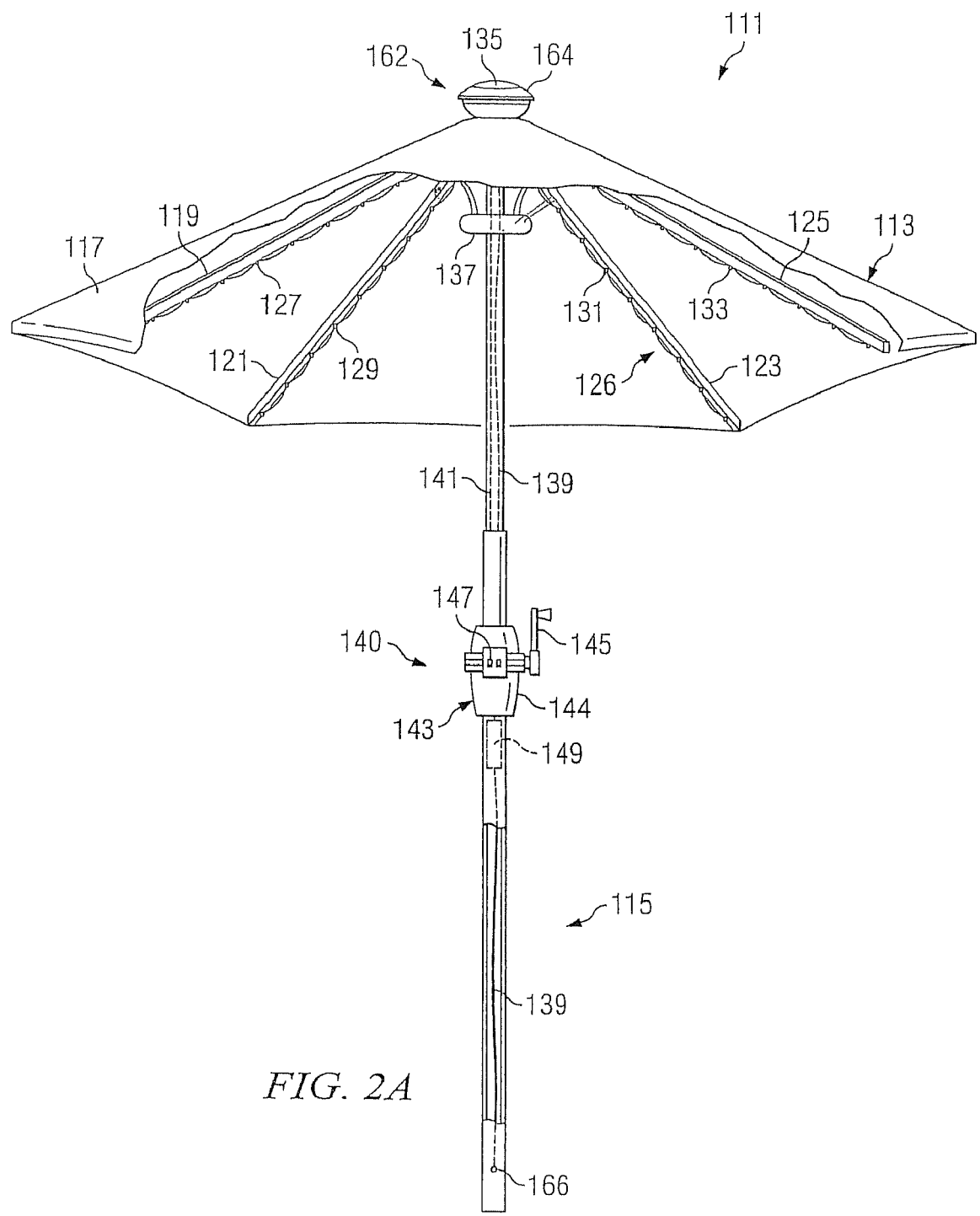
FIGS. 2A, 2B, and 2C are pictorial, fragmentary, and section views of an alternate embodiment of the present invention which is directed to a lighted umbrella with a stand and a single battery and removable base cover.
Figure 2B:
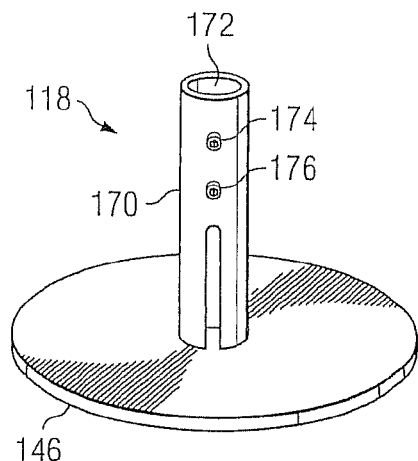
Figure 2C:
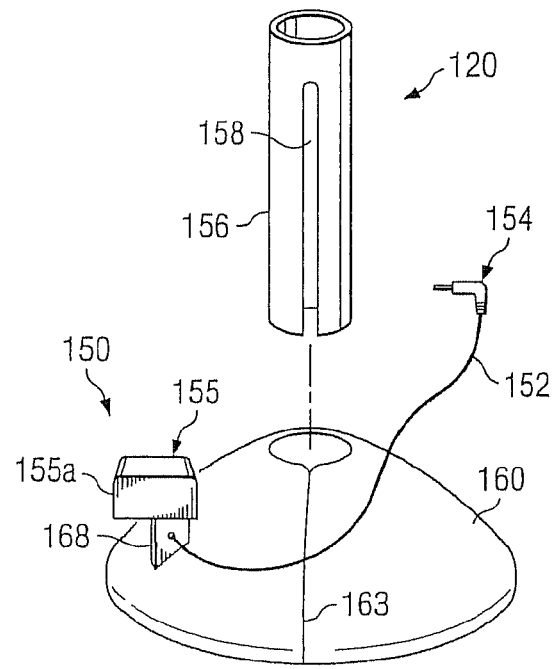

Referring now to FIGS. 2A-2C in the drawings, another embodiment of the present invention is illustrated. In this embodiment, an umbrella apparatus 111 includes an umbrella portion 113, a pole portion 115, a stand portion 118, and a base portion 120 adapted to house a rechargeable power system 151. Umbrella apparatus 11 includes a lighting system 126 and may include a motorized opening and closing system 140. Umbrella portion 113 is preferably retractable and may be moved between a raised, or expanded open position, which is shown; and a lowered, or retracted, closed position in which umbrella portion is collapsed down about pole portion 115, as is conventional. A flexible canopy 117 is attached to and covers umbrella portion 115. Canopy 117 is supported by a plurality of rib members 119, 121, 123, and 125. Rib members 119, 121, 123, and 125 are preferably hingedly coupled to pole portion 115 at an upper portion of pole portion 115. An integral lighting system 126 is carried by at least one of rib members 119, 121, 123, or 125. Lighting system 126 provides high intensity light to umbrella apparatus 111 and the surrounding area. In the embodiment of FIGS. 2A-2C, lighting system 126 preferably utilizes a cold cathode tube which will be described in greater detail herein.

Lighting system 126 includes a plurality of light strands 127, 129, 131, and 133 attached to rib members 119, 121, 123, and 125. Each light strand 127, 129, 131, and 133 includes electrical wiring 139 which conductively couples a plurality of small cold cathode tube light bulbs together for providing the high intensity light under canopy 117 and in the area surrounding umbrella apparatus 111. A wiring ring 137 secures and locates electrical wiring 139 of light strands 127, 129, 131, and 133, so that electrical wiring 139 may be passed through the hollow interior of pole portion 115 to a power source, as will be described in detail below.

Umbrella apparatus 111 includes an optional opening and closing system 140 that aids in expanding umbrella portion 113 into the open condition and retracting umbrella portion 113 into the closed condition. Opening and closing system 140 includes a cable system 141, a gear and pulley system 143 housed in a crank case 144, and a manual crank 145. Crank case 144 is preferably located on pole portion 115 such that crank case 144 is accessible when umbrella portion 113 is in the fully retracted position against pole portion 115. Cable system 141 is coupled between rib members 119, 121, 123, and 125 and gear and pulley system 143, and is preferably disposed within the hollow interior of pole portion 115. Manual crank 145 is coupled to gear and pulley system 143 so as to allow manual opening and closing of umbrella portion 113.

Opening and closing system 140 may be automated by the inclusion of an electric screw driver motor 149, or other similar relatively small diameter motor assembly, and one or more operational switches 147. Motor 149 is preferably disposed within the hollow interior of pole portion 115 and is coupled to gear and pulley system 143. Operational switches 147 are preferably carried by crank case 144, and include one or more switches for controlling the operation of motor 149. With the inclusion of motor 149, a user may expand and retract umbrella portion 113 simply by pressing the appropriate operational switch 147. This feature is particularly advantageous when used with large umbrellas which may be relatively heavy and awkward to operate, or when the user lacks sufficient strength to expand or retract umbrella portion 113.

Umbrella apparatus 111 includes a power system 150 having a power source 155. In this embodiment, power source 155 is preferably adapted to be conductively coupled to base portion 120 and comprises a rechargeable battery pack 155*a*, preferably an 18-Volt rechargeable battery pack. Battery pack 155*a* is preferably the type of rechargeable battery that is utilized with most modern cordless power tools, such as drills, saws, and sanders. Battery pack 155*a* is adapted to be repeatedly recharged by plugging battery pack 155*a* into a conventional charger (not shown) that is plugged into a conventional AC power outlet. Power system 150 provides electrical power to lighting system 126 and opening and closing system 140.

In accordance with a preferred embodiment of the present invention, an alternative power system charger 162 may be provided. Alternate power system charger 162 includes at least one solar cell 135 carried by an upper cap portion 164. Solar cells 135 are conductively coupled to power system 150 via wires (not shown) that pass through the hollow interior of pole portion 115, thereby allowing solar cells 135 to provide an electrical charge to recharge rechargeable battery pack 155*a*, provided sunlight falls upon solar cells 135. Because solar cells 135 provide continuous recharging throughout the daylight hours, the frequency with which battery pack 155*a* must be replaced or recharged may be minimized. It is important to note that locating alternate power system charger 162 atop umbrella portion 113 is unique and advantageous, particularly when alternate power system charger 162 includes solar cells 135 or other types of solar energy collectors. Such location limits the visibility of alternate power system charger 162 and ensures that solar energy collection is maximized.

Stand portion 118 includes an upright shaft portion 170 having a central aperture 172 that is adapted to receive the pole portion 115 of umbrella apparatus 111. A plurality of screw clamps 174 and 176 are provided to secure pole portion 115 within shaft portion 170. A bottom portion 146 is provided to stabilize umbrella apparatus 111 while umbrella apparatus 111 is installed within stand portion 118.

Base portion 120 includes a removable cylindrical sleeve 156, a removable cover 160, and a receiver 168. Sleeve 156 is configured to slip over the exterior of shaft portion 170, and includes a longitudinal slot 158 that allows access to screw clamps 174 and 176 when sleeve 156 is placed over shaft portion 170. Slot 158 also allows access to a connector 166 disposed in the lower portion of pole portion 115 when sleeve 156 is placed over shaft portion 170. Connector 166 is conductively coupled to the wires from alternate power system charger 162 and solar cells 135. Cover 160 is preferably concave in shape, thereby defining an interior space which may be used to house the electronics (not shown) of power system 150. Cover 160 may include one or more seams 163 that allow access to the interior space defined by cover 160. Receiver 168 releasably receives battery pack 155*a*. A wire 152 and plug 154 conductively couple battery pack 155*a* to connector 166, thereby providing an electrical circuit between rechargeable battery pack 155*a* and light strands 119, 121, 123, and 125 of lighting system 126.

The embodiment depicted in FIGS. 2A-2C is advantageous over the prior art in that it provides a number of useful functions. Umbrella apparatus 111 is lighted by lighting system 126 which does not require continuous access to a conventional AC wall outlet, while providing high intensity light. This allows umbrella apparatus 111 to be placed in a relatively remote lawn or garden locations that are away from, or substantially removed from, conventional AC power outlets. During daylight hours, solar cells 135 provide a continuous trickle charge to recharge rechargeable battery pack 155*a*, thereby reducing the frequency with which battery pack 155*a* must be replaced or recharged. Additionally, this embodiment is advantageous over the prior art in that conventional rechargeable battery packs, which are commonly used with cordless power tools, may be utilized. If battery pack 155*a* is insufficiently charged illuminate light strands 119, 121, 123, and 125 of light system 126, the user may simply replace battery pack 155*a* with another fully charged battery pack 155*a*. In this manner, lighting system 126 of umbrella apparatus 111 may be energized conveniently, even though umbrella apparatus 111 may be located extremely remotely from an AC power outlet, such as in a garden patio, or on a boat dock. In this embodiment, there is no need to use extension cords to charge an alternate power system charger.

Figure 3A:
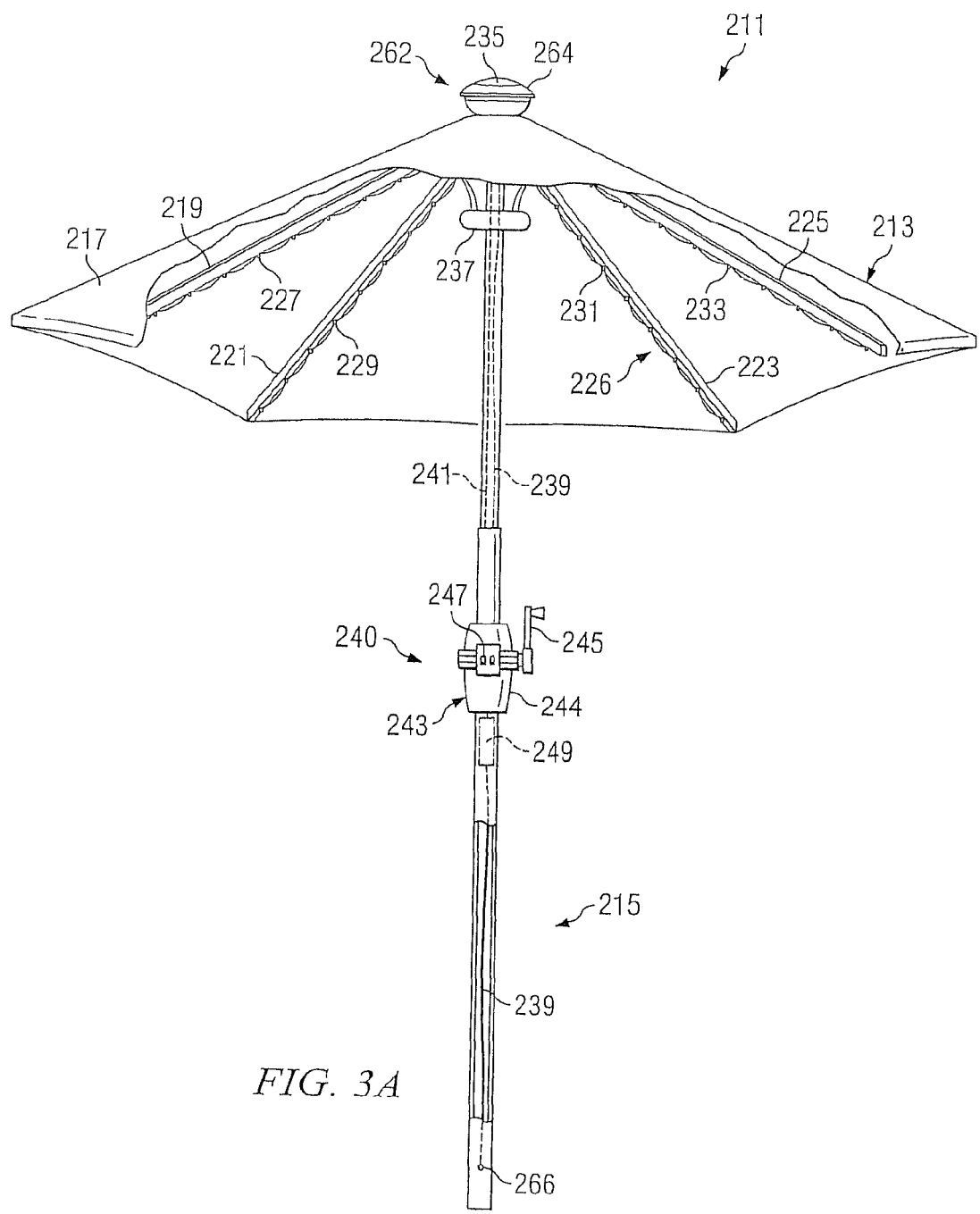
FIGS. 3A, 3B, and 3C are pictorial, fragmentary, and partial section views of another alternate embodiment of the present invention which is directed to a lighted umbrella with a stand, charger, batteries, and removable battery cover.
Figure 3B:
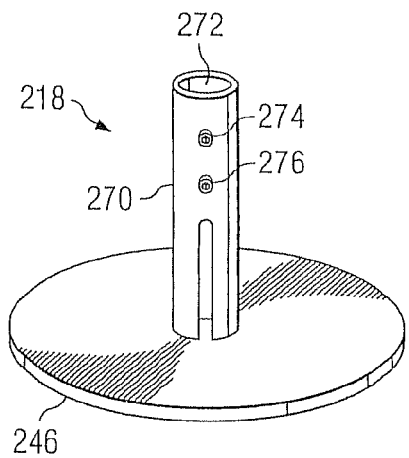
Figure 3C:
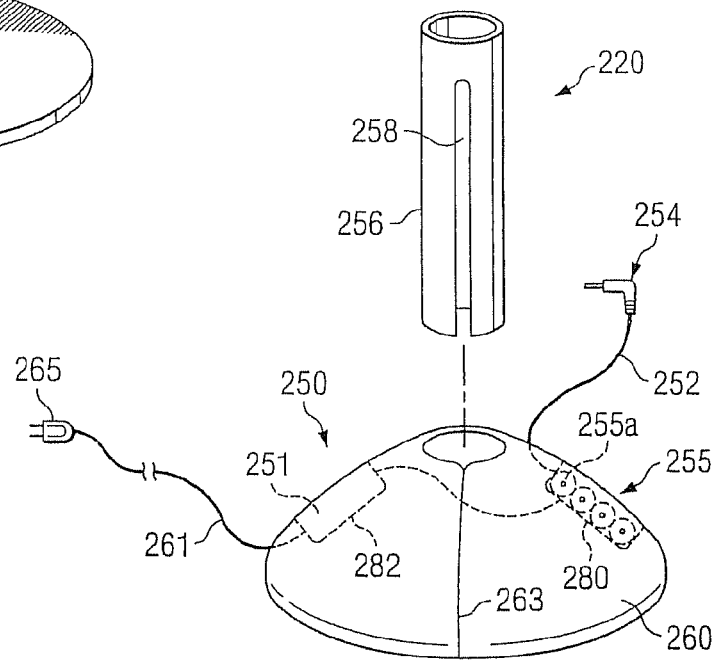

Referring now to FIGS. 3A-3C in the drawings, another embodiment of the present invention is illustrated. In this embodiment, an umbrella apparatus 211 includes an umbrella portion 213, a pole portion 215, a stand portion 218, and a base portion 220 adapted to house a rechargeable power system 251. Umbrella apparatus 211 includes a lighting system 226 and may include a motorized opening and closing system 240. Umbrella portion 213 is preferably retractable and may be moved between a raised, or expanded open position, which is shown; and a lowered, or retracted, closed position in which umbrella portion is collapsed down about pole portion 215, as is conventional. A flexible canopy 217 is attached to and covers umbrella portion 215. Canopy 217 is supported by a plurality of rib members 219, 221, 223, and 225. Rib members 219, 221, 223, and 225 are preferably hingedly coupled to pole portion 215 at an upper portion of pole portion 215. An integral lighting system 226 is carried by at least one of rib members 219, 221, 223, or 225. Lighting system 226 provides high intensity light to umbrella apparatus 211 and the surrounding area. In the embodiment of FIGS. 3A-3C, lighting system 226 preferably utilizes a cold cathode tube which will be described in greater detail herein.

Lighting system 226 includes a plurality of light strands 227, 229, 231, and 233 attached to rib members 219, 221, 223, and 225. Each light strand 227, 229, 231, and 233 includes electrical wiring 239 which conductively couples a plurality of small cold cathode tube light bulbs together for providing the high intensity light under canopy 217 and in the area surrounding umbrella apparatus 211. A wiring ring 237 secures and locates electrical wiring 239 of light strands 227, 229, 231, and 233, so that electrical wiring 239 may be passed through the hollow interior of pole portion 215 to a power source, as will be described in detail below.

Umbrella apparatus 211 includes an optional opening and closing system 240 that aids in expanding umbrella portion 213 into the open condition and retracting umbrella portion 213 into the closed condition. Opening and closing system 240 includes a cable system 241, a gear and pulley system 243 housed in a crank case 244, and a manual crank 245. Crank case 244 is preferably located on pole portion 215 such that crank case 244 is accessible when umbrella portion 213 is in the fully retracted position against pole portion 215. Cable system 241 is coupled between rib members 219, 221, 223, and 225 and gear and pulley system 243, and is preferably disposed within the hollow interior of pole portion 215. Manual crank 245 is coupled to gear and pulley system 243 so as to allow manual opening and closing of umbrella portion 213.

Opening and closing system 240 may be automated by the inclusion of an electric screw driver motor 249, or other similar relatively small diameter motor assembly, and one or more operational switches 247. Motor 249 is preferably disposed within the hollow interior of pole portion 215 and is coupled to gear and pulley system 243. Operational switches 247 are preferably carried by crank case 244, and include one or more switches for controlling the operation of motor 249. With the inclusion of motor 249, a user may expand and retract umbrella portion 213 simply by pressing the appropriate operational switch 247. This feature is particularly advantageous when used with large umbrellas which may be relatively heavy and awkward to operate, or when the user lacks sufficient strength to expand or retract umbrella portion 213.

Umbrella apparatus 211 includes a power system 250 having a rechargeable power source 255. In this embodiment, power source 255 is preferably adapted to be conductively coupled to and hosed within base portion 220 and comprises a bundle of rechargeable batteries 255a. Power system 250 provides electrical power to lighting system 226 and opening and closing system 240. An external power system charger and transformer 251 are electrically coupled to power system 250 to aid in repeatedly charging rechargeable batteries 255a. An extension cord 261 having terminals 265 allow external power system charger and transformer 251 to be plugged into a conventional AC wall outlet. This allows external power system charger and transformer 251 to receive power directly from a conventional AC wall outlet in order to recharge rechargeable batteries 255a.

In accordance with a preferred embodiment of the present invention, an alternative power system charger 262 may be provided. Alternate power system charger 262 includes at least one solar cell 235 carried by an upper cap portion 264. Solar cells 235 are conductively coupled to power system 250 via wires (not shown) that pass through the hollow interior of pole portion 215, thereby allowing solar cells 235 to provide an electrical charge to recharge rechargeable batteries 255a, provided sunlight falls upon solar cells 235. Because solar cells 235 provide continuous recharging throughout the daylight hours, the frequency with which batteries 255a must be replaced or recharged may be minimized. It is important to note that locating alternate power system charger 262 atop umbrella portion 213 is unique and advantageous, particularly when alternate power system charger 262 includes solar cells 235 or other types of solar energy collectors. Such location limits the visibility of alternate power system charger 262 and ensures that solar energy collection is maximized.

Stand portion 218 includes an upright shaft portion 270 having a central aperture 272 that is adapted to receive pole portion 215 of umbrella apparatus 211. A plurality of screw clamps 274 and 276 are provided to secure pole portion 215 within shaft portion 270. A bottom portion 246 is provided to stabilize umbrella apparatus 211 while umbrella apparatus 211 is installed within stand portion 218.

Base portion 220 includes a removable cylindrical sleeve 256, a removable cover 260, and recessed portions 280 and 282. Sleeve 256 is configured to slip over the exterior of shaft portion 270, and includes a longitudinal slot 258 that allows access to screw clamps 274 and 276 when sleeve 256 is placed over shaft portion 270. Slot 258 also allows access to a connector 266 disposed in the lower portion of pole portion 215 when sleeve 256 is placed over shaft portion 270. Connector 266 is conductively coupled to the wires from alternate power system charger 262 and solar cells 235. Cover 260 is preferably concave in shape, thereby defining an interior space which may be used to house the electronics (not shown) of power system 250. Cover 260 may include one or more seams 263 that allow access to the interior space defined by cover 260. Recessed portion 280 releasably receives batteries 255a, and recessed portion 282 releasably receives external power system charger 251. A wire 252 and plug 254 conductively couple batteries 255a to connector 266, thereby providing an electrical circuit between rechargeable batteries 255a and light strands 219, 221, 223, and 225 of lighting system 226.

The embodiment depicted in FIGS. 3A-3C is advantageous over the prior art in that it provides a number of useful functions. Umbrella apparatus 211 is lighted by lighting system 226 which does not require continuous access to a conventional AC wall outlet, while providing high intensity light. This allows umbrella apparatus 211 to be placed in a relatively remote lawn or garden locations that are away from, or substantially removed from, conventional AC power outlets. During daylight hours, solar cells 235 provide a continuous trickle charge to recharge rechargeable batteries 255a, thereby reducing the frequency with which batteries 255a must be replaced or recharged. However, when an electrical charge is needed, external power system charger 251 may be utilized to directly charge batteries 255a. Of course, a conventional extension cord may be used, thereby eliminating the need to move umbrella apparatus 211 from its remote location to a location near an AC power outlet.

Figure 4A:
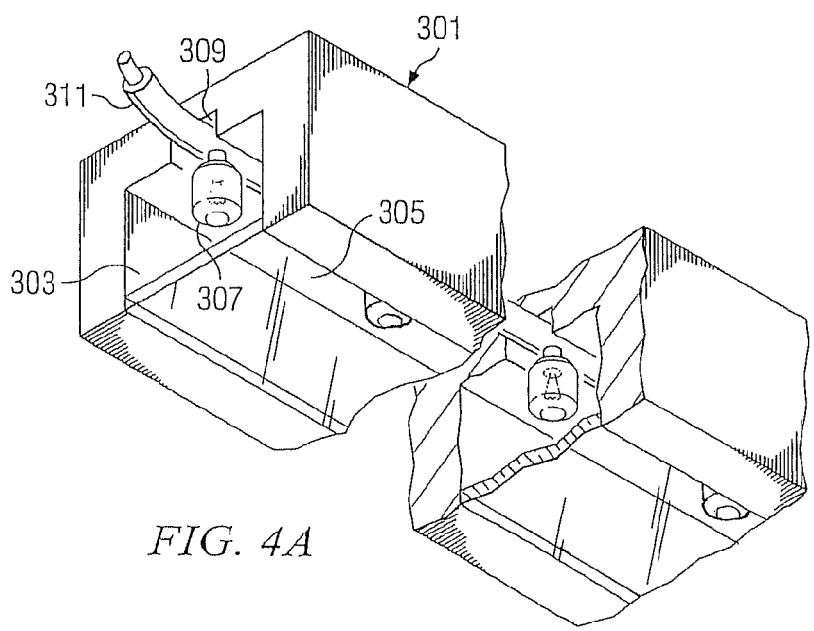
FIG. 4A is a fragmentary and sectional view of another alternate embodiment of the present invention which is directed to a lighted umbrella with recessed lighting.

Referring now to FIG. 4A in the drawings, the preferred embodiment of lighting systems 26, 126, and 226 of the present invention is illustrated. In this embodiment, a plurality of lighting elements 307, preferably cold cathode tube bulbs, are recessed into a rib member 301. Rib member 301 is indicative of rib members 19, 21, 23, 25, 119, 121, 123, 125, 219, 221, 223, and 225. As is shown, a cavity 303 is formed within rib 301. Cavity 303 is adapted to receive and hold light bulb 307. A translucent material 305 extends along the entire length of the cavity 303 to protect bulbs 307 from damage and undesirable exposure to weather and other conditions. Translucent material 305 may have a smooth surface or be textured to accentuate or enhance the light from bulbs 307. Although only a single cold cathode tube bulb 307 is illustrated, it should be understood that there may be many bulbs 307 spaced along the length of rib member 301 to illuminate the area under umbrella apparatus 11, 111, or 211. Rib member 301 includes a wiring channel 309 configured to receive a wire 311 that conductively connects all of the bulbs 307 installed in rib member 301, thereby forming an electrical circuit between bulbs 307 and the rechargeable power source, such as power sources 50, 150, and 250. In this manner, recessed lighting, which is carried entirely within rib member 301 and is not otherwise exposed to the elements, is achieved.

Figure 4B:
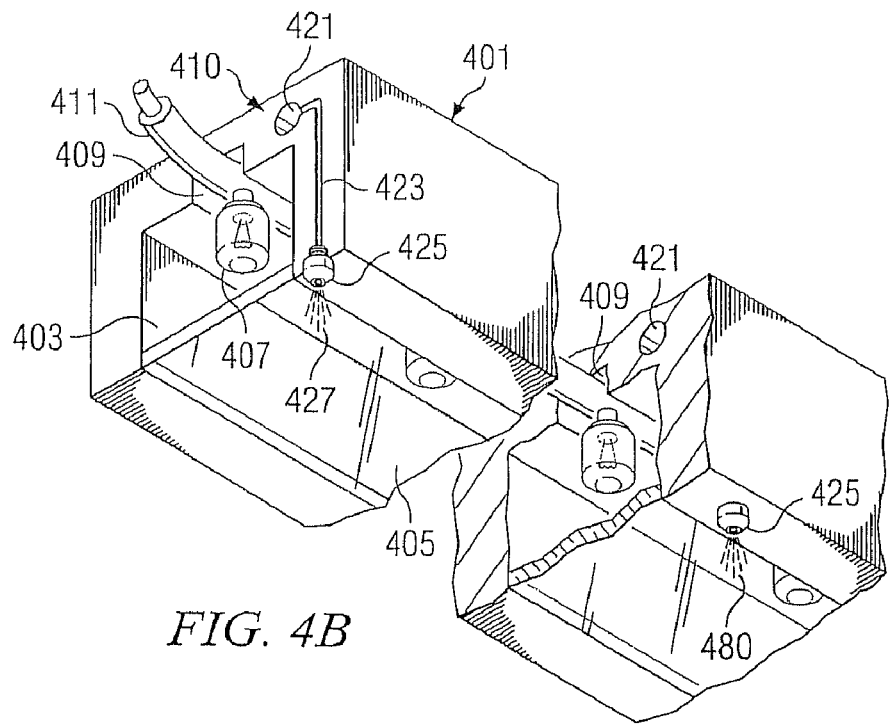
FIG. 4B is a fragmentary and sectional view of another alternate embodiment of the present invention which is directed to a lighted umbrella with integral misting system.

Referring now to FIG. 4B in the drawings, an alternate embodiment of lighting systems 26, 126, and 226 of the present invention is illustrated. This embodiment is similar to the embodiment of FIG. 4A, with the exception that an integral cooling system 410 has been added. In this embodiment, a plurality of lighting elements 307, preferably cold cathode tube bulbs, are recessed into a rib member 301. Rib member 301 is indicative of rib members 19, 21, 23, 25, 119, 121, 123, 125, 219, 221, 223, and 225. Cooling system 410 comprises a misting means that provides a light mist to cool the area under umbrella apparatus 11, 111, or 211. A cavity 403 is formed within rib member 401. Cavity 403 is adapted to receive and hold light bulb 407. A translucent material 405 extends along the entire length of the cavity 403 to protect bulbs 407 from damage and undesirable exposure to weather and other conditions. Translucent material 405 may have a smooth surface or be textured to accentuate or enhance the light from bulbs 407. Although only a single cold cathode tube bulb 407 is illustrated, it should be understood that there may be many bulbs 407 spaced along the length of rib member 401 to illuminate the area under umbrella apparatus 11, 111, or 211. Rib member 401 includes a wiring channel 409 configured to receive a wire 411 that conductively connects all of the bulbs 407 installed in rib member 401, thereby forming an electrical circuit between bulbs 407 and the rechargeable power source, such as power sources 50, 150, and 250. In this manner, recessed lighting, which is carried entirely within rib member 401 and is not otherwise exposed to the elements, is achieved.

A fluid supply channel 421 is provided in order to receive a fluid tight hose which supplies water to a plurality of misting nozzles 425 which generate mist 427 and 480. A fluid discharge channel 423 is provided to carry a fluid tight hose which carries water from the hose in fluid supply channel 421 to misting nozzles 425. In this embodiment, umbrella apparatus should include a small reservoir (not shown) of water or other water source, such as an inlet hose, and an electric pump to pressurize and pump the water through cooling system 410. In this manner, umbrella apparatus 11, 111, or 211 provides both light and a cooling mist to those in close proximity.

Figure 4C:
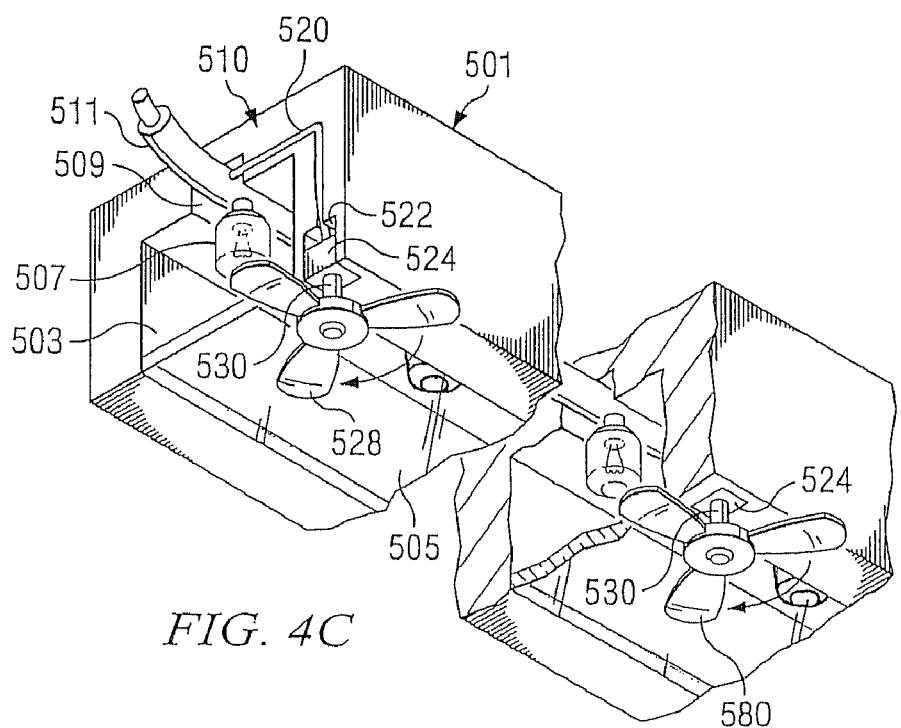
FIG. 4C is a fragmentary and sectional view of another alternate embodiment of the present invention which is directed to a lighted umbrella with an integral fan system.

Referring now to FIG. 4C in the drawings, another embodiment of lighting systems 26, 126, and 226 of the present invention is illustrated. This embodiment is similar to the embodiment of FIG. 4A, with the exception that a different integral cooling system 510 has been added. In this embodiment, a plurality of lighting elements 507, preferably cold cathode tube bulbs, are recessed into a rib member 501. Rib member 501 is indicative of rib members 19, 21, 23, 25, 119, 121, 123, 125, 219, 221, 223, and 225. Cooling system 510 comprises a fanning means that provides a cool breeze under umbrella apparatus 11, 111, or 211. A cavity 503 is formed within rib member 501. Cavity 503 is adapted to receive and hold light bulb 507. A translucent material 505 extends along the entire length of the cavity 503 to protect bulbs 507 from damage and undesirable exposure to weather and other conditions. Translucent material 505 may have a smooth surface or be textured to accentuate or enhance the light from bulbs 507. Although only a single cold cathode tube bulb 507 is illustrated, it should be understood that there may be many bulbs 507 spaced along the length of rib member 501 to illuminate the area under umbrella apparatus 11, 111, or 211. Rib member 501 includes a wiring channel 509 configured to receive a wire 511 that conductively connects all of the bulbs 507 installed in rib member 501, thereby forming an electrical circuit between bulbs 507 and the rechargeable power source, such as power sources 50, 150, and 250. In this manner, recessed lighting, which is carried entirely within rib member 501 and is not otherwise exposed to the elements, is achieved.

A wiring conduit 520 is provided which routes electrical wiring from wire 511 to an electric motor 524 carried in a recessed cavity 522. Fanning means 528 and 580, such as fan blades, are carried by rotating shafts 530 which are connected to motors 524. When energized, motors 524 rotate fan blades 528 and 580, thereby providing a cooling breeze under umbrella apparatus 11, 111, and 211. A plurality of fan blade sets 528 and 580 may be located at predetermined locations along the length of rib member 501.

Figure 5A:
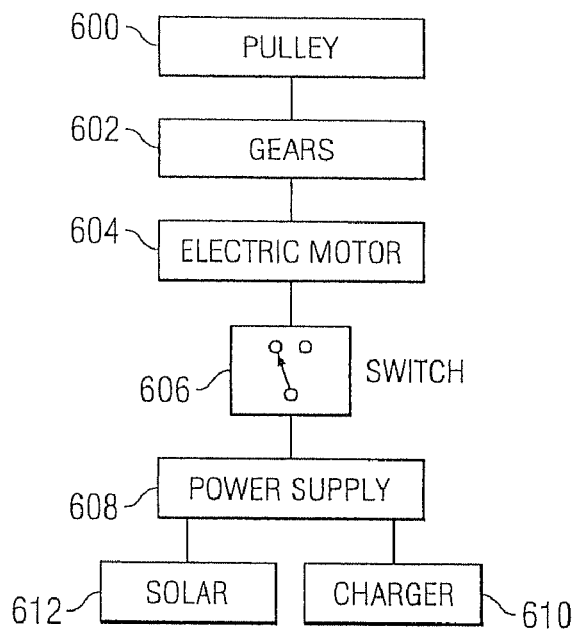
FIG. 5A is a block diagram representation of the motorized opening and closing system of the umbrella of FIG. 1 and of the other embodiments of the umbrella of the present invention.

Referring now to FIG. 5A in the drawings, a block diagram representation of the preferred embodiment of opening and closing systems 40, 140, and 240 is illustrated. As is shown, a pulley system 600 is coupled through gears 602 to an electric motor 604. A switch 606 is electrically connected between a power supply 608 and electric motor 604. Power supply 608 is indicative of rechargeable power systems 50, 150, and 250. External power system charger 610 and solar charger 612 are coupled to power supply 608 to recharge the rechargeable battery elements. External power system charger 610 is indicative of external power system chargers 51 and 251. Solar charger 612 is indicative of alternate power system chargers 62, 162, and 262. Mechanical actuation of switch 606 allows current to flow from power supply 608 to electric motor 604. Motor 604 works through gears 602 to operate pulley 600, thereby opening and closing canopy 17, 117, or 217 of umbrella apparatus 11, 111, or 211, respectively.

Figure 5B:
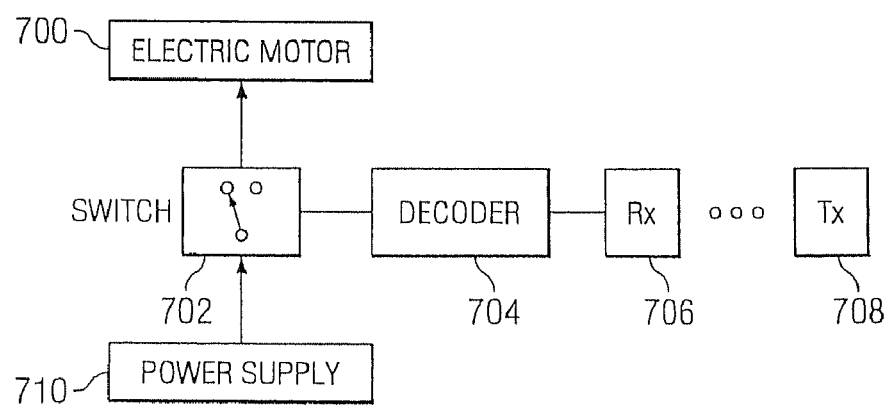
FIG. 5B is a block diagram representation of an alternate embodiment of the motorized opening and closing system of FIG. 5A.

Referring now to FIG. 5B in the drawings, another embodiment of the opening and closing systems 40, 140, and 240 of the present invention is illustrated. In this embodiment, a wireless transmitter 708 is utilized to transmit encoded signals and remotely communicate with a wireless receiver 706 that is carried by umbrella apparatus 11, 111, or 211, preferably near housings 44, 144, and 244. A decoder 704 is provided to decode the encoded signals. As is conventional with such receivers and transmitters, transmitter 708 and receiver 706 may be adapted to be coded on a particular frequency or coding scheme which enable a dedicated transmitter 708 to actuate a particular receiver 706. A decoder 704 coupled to an electrical switch 702 serves to allow for such identification. Switch 702 controls the application of electrical energy from a power supply 710 to an electric motor 700. Power supply 710 is indicative of rechargeable power systems 50, 150, and 250. Motor 700 is indicative of motors 49, 149, and 249. In this manner, a motorized retraction system may be actuated remotely utilizing wireless transmitter 708.

Figure 6:
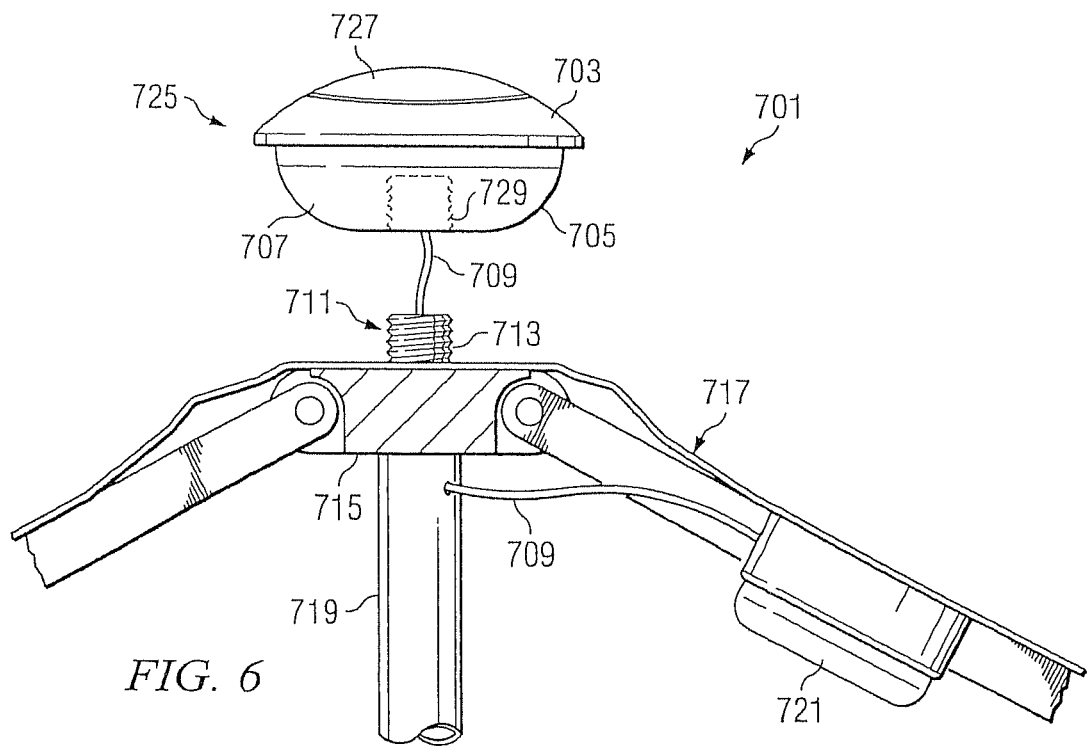
FIG. 6 is a simplified schematic of an alternative embodiment of the present invention which is directed to a lighted umbrella with a top-mounted power unit and a cold cathode tube lighting system.
Figure 7:
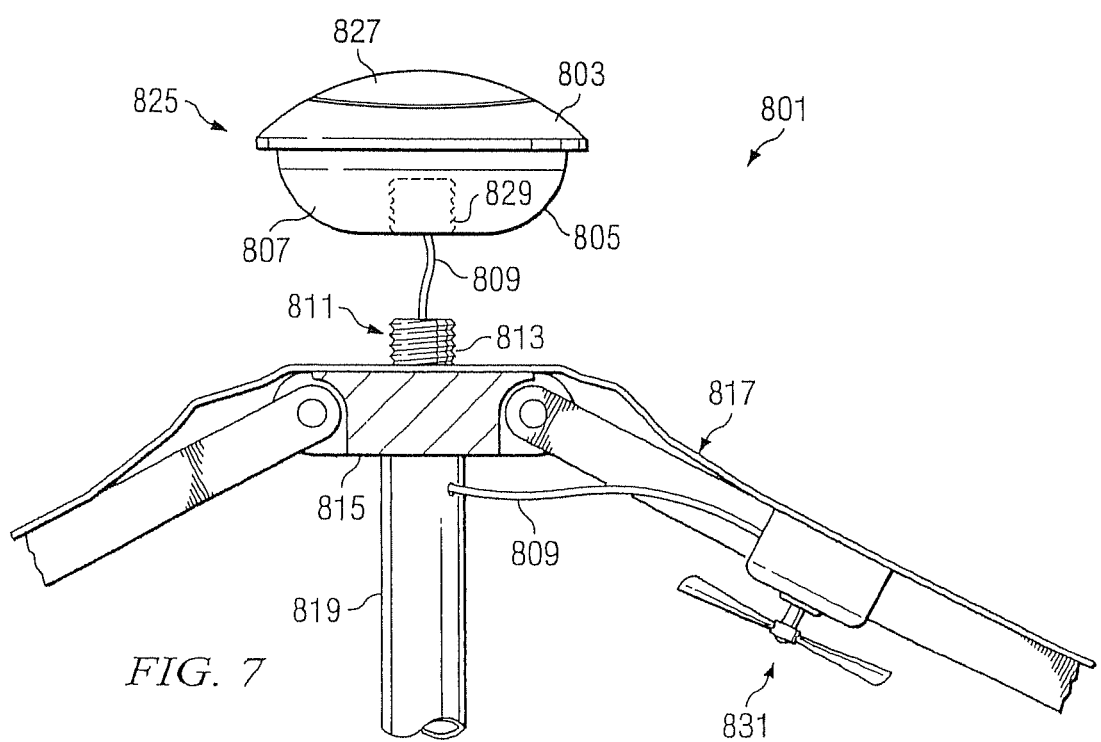
FIG. 7 is a simplified schematic of an alternative embodiment of the present invention which is directed to an umbrella with a top-mounted power unit and an electric fan cooling system.
Figure 8:
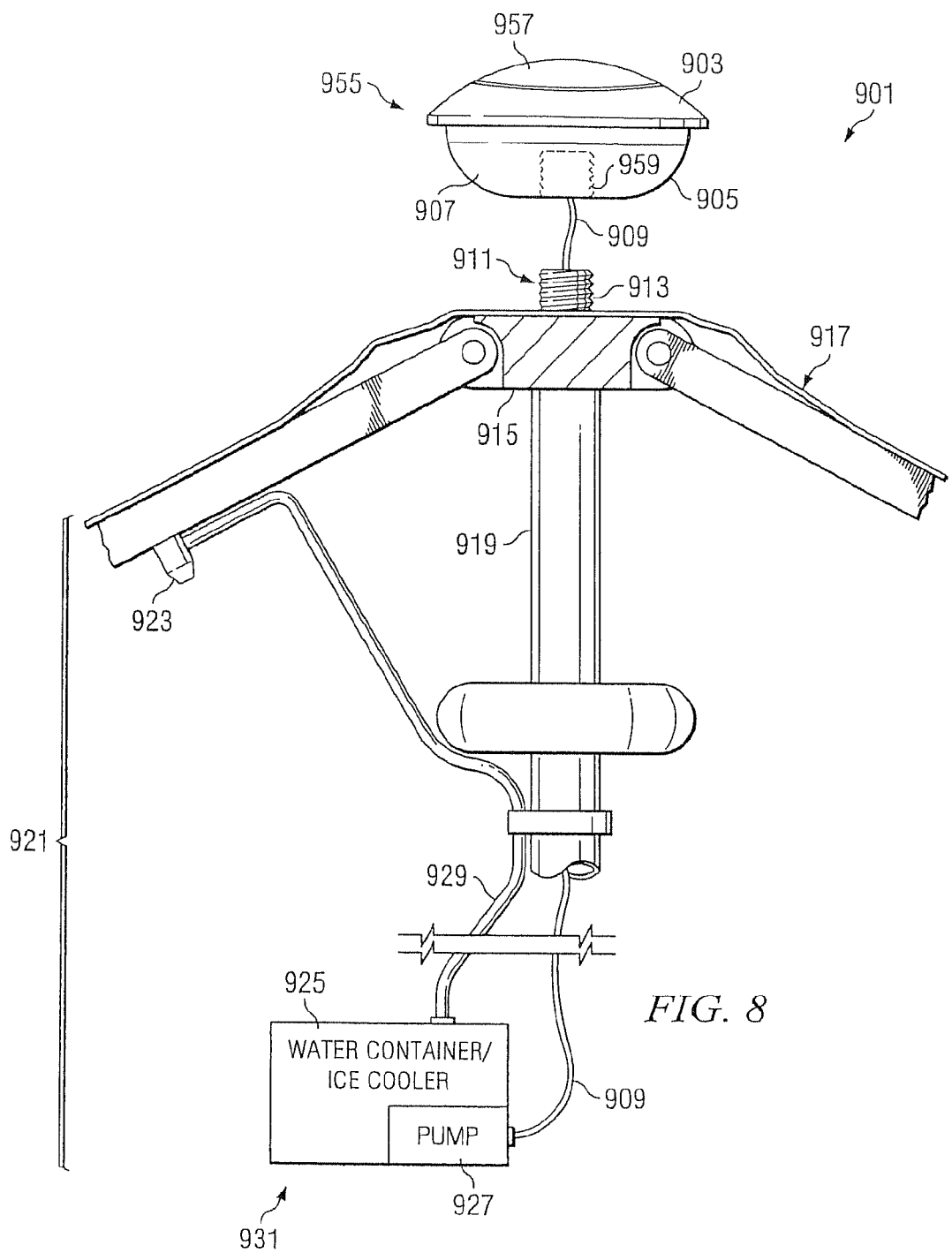
FIG. 8 is a simplified view of an alternative embodiment of the present invention which is directed to an umbrella with a top-mounted power unit and a mist producing cooling system.
Figure 9:
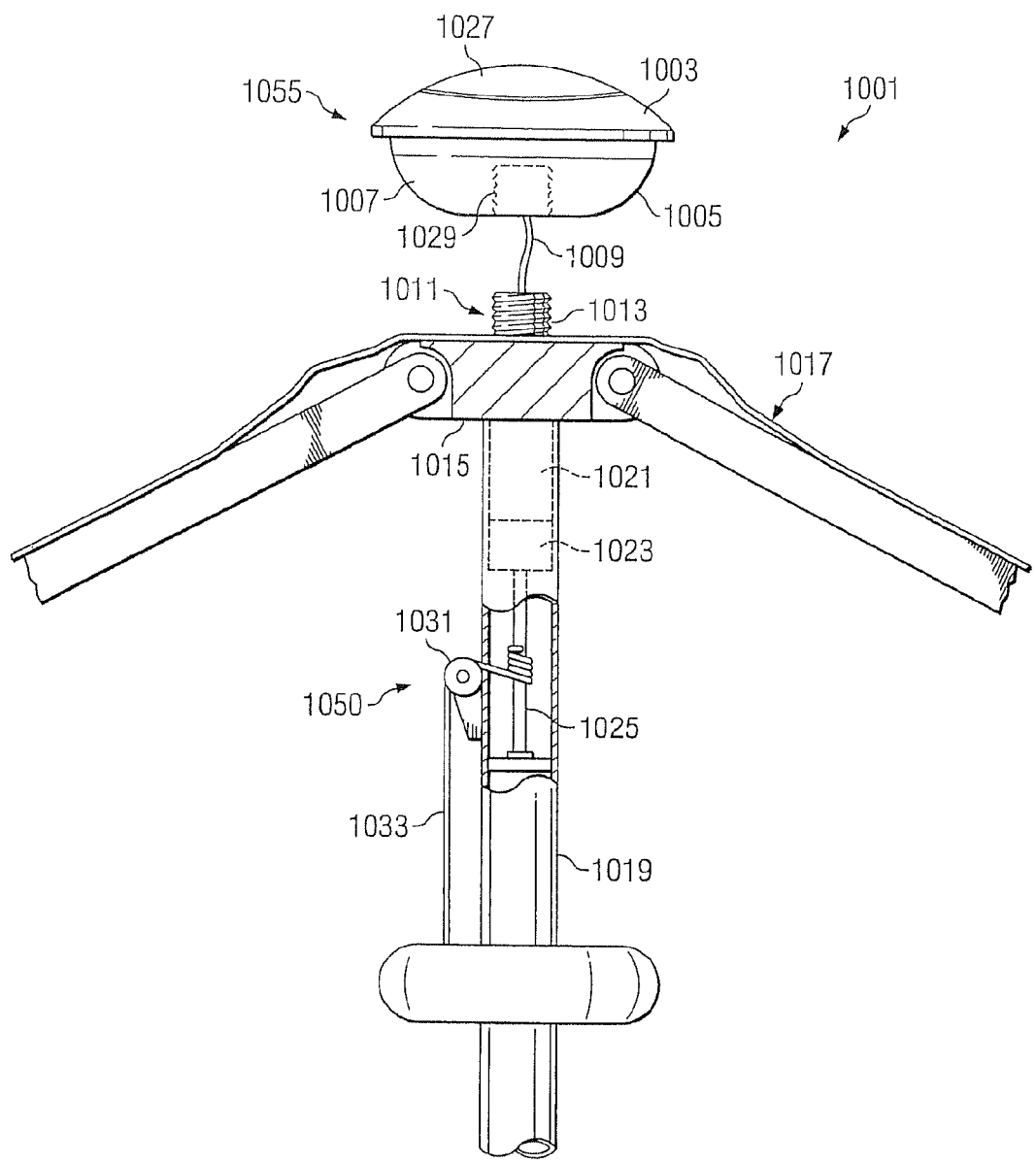
FIG. 9 is a simplified schematic of an alternate embodiment of the present invention that is directed to an umbrella with a top-mounted power unit and a motorized opening and closing system.

Referring now to FIGS. 6-9 in the drawings, the preferred embodiments of the umbrella apparatus of the present invention are illustrated. In these embodiments, the rechargeable power source and solar recharging system are mounted atop the pole portion of the umbrella apparatus above the canopy. One concept which runs throughout the embodiments depicted in FIGS. 6-9 is the utilization of a "power unit." This concept involves the placement of a unitary structure at a defined location relative to the umbrella. For example, in the embodiments of FIGS. 6-9, the power unit is shown at a top location directly above the umbrella apparatus, and secured to the pole portion with a threaded coupling. FIG. 6 depicts a top-mounted power unit and a cold cathode tube lighting system. FIG. 7 depicts a top-mounted power unit with a fanning means cooling system. FIG. 8 depicts a top-mounted power unit with mist producing cooling system. FIG. 9 depicts a top-mounted power unit with an automated opening and closing system.

Although FIGS. 6-9 depict power units with a single electrical system, it should be understood that in alternative embodiments, one could mix and match these electrical subassemblies such that a single power unit provides electrical power to two or more subassemblies. For example, an umbrella apparatus may include a lighting system and either one or both of the cooling systems described above. Alternatively, an umbrella apparatus may include a lighting system, a cooling system, and an automated opening and closing system as described herein. In this manner, the umbrella apparatus of the present invention is modular such that the different subsystems can be easily mixed and matched.

This modularity allows one to manufacture and sell aftermarket kits which can be installed and interchanged by the umbrella owners. Such kits may include a power unit and one or more of the subsystems, such as a lighting system and/or a cooling system and/or an automated opening and closing system. Because the power unit is relatively self-contained, little interaction is required to attach the power unit to an umbrella apparatus. Alternatively, this modularity in design facilitates the mass manufacture of umbrellas, allowing the electrical system to be manufactured by one factory, and the umbrella systems, which do not include electrical systems, to be manufactured by a different factory. The parts can then be brought together in an assembly area and assembled together.

Referring now specifically to FIG. 6, an umbrella apparatus 701 is illustrated. As is shown, a power unit 725 is provided for connection to the uppermost portion of umbrella apparatus 701. In this embodiment, a cold cathode tube light subassembly 721 is provided for connection at a different location to umbrella apparatus 701. Power unit 725 includes a solar collector 727 at its uppermost portion. Solar collector 727 is preferably carried by a top portion 703 of power unit 725. A bottom portion 705 of power unit 725 defines an interior battery compartment 707. Additionally, power unit 725 carries a coupling mechanism 729 to allow coupling between power unit 725 and a pole portion 719 of umbrella apparatus 701, pole portion 719 being adapted at an upper end 711, preferably with threads 713, to releasably receive power unit 725. A top cap 715 hingedly connects pole portion 719 to a canopy 717. Cold cathode tube light subassembly 721 is coupled at a desired location underneath canopy 717 to provide high intensity light in the area surrounding umbrella apparatus 701. Cold cathode tube light subassembly 721 is conductively coupled to power unit 725 by wiring 709 that passes through the hollow interior of pole portion 719. Such light allows users to read, play games, or perform other leisure activities that require a relatively high intensity light. The electrical components of umbrella apparatus 701 are entirely independent of any household electrical system. The power source, such as power sources 50, 150, and 250, carried by power unit 725 is utilized to energize cold cathode tube light subassembly 721. During daylight hours, solar energy is collected by solar panel 727 and is converted and utilized to recharge the rechargeable power source which is maintained within battery compartment 707.

Cold cathode tube light subassembly 721 is described below in more detail below. As will be appreciated by those skilled in the art, other low power lighting systems may be used instead of cold cathode tube light sub assembly 721. For example, an LED or fluorescent lighting subassembly may be utilized instead. LED and fluorescent systems designed for use with solar and low voltage lighting are known in the art. Such alternative lighting sources may be easily used with the present system in manners which are recognized by those skilled in the art. Implementation of LED, fluorescent, or other alternate light sources instead of cold cathode tube light subassembly 721 is a straightforward and need not be further described in detail.

Referring now specifically to FIG. 7 in the drawings, an umbrella apparatus 801 is illustrated. As is shown, a power unit 825 is provided for connection to the uppermost portion of umbrella apparatus 801. In this embodiment, a cooling system 821 comprising a fanning means 831 is provided for connection at a different location to umbrella apparatus 801. Power unit 825 includes a solar collector 827 at its uppermost portion. Solar collector 827 is preferably carried by a top portion 803 of power unit 825. A bottom portion 805 of power unit 825 defines an interior battery compartment 807. Additionally, power unit 825 carries a coupling mechanism 829 to allow coupling between power unit 825 and a pole portion 819 of umbrella apparatus 801, pole portion 819 being adapted at an upper end 811, preferably with threads 813, to releasably receive power unit 825. A top cap 815 hingedly connects pole portion 819 to a canopy 817. Cooling system 821 is coupled at a desired location underneath canopy 817 to provide a cooling breeze in the area surrounding umbrella apparatus 801. Cooling system 821 is conductively coupled to power unit 825 by wiring 809 that passes through the hollow interior of pole portion 819. The electrical components of umbrella apparatus 801 are entirely independent of any household electrical system. The power source, such as power sources 50, 150, and 250, carried by power unit 825 is utilized to energize cooling system 821. During daylight hours, solar energy is collected by solar panel 827 and is converted and utilized to recharge the rechargeable power source which is maintained within battery compartment 807.

Referring now specifically to FIG. 8 in the drawings, an umbrella apparatus 901 is illustrated. As is shown, a power unit 955 is provided for connection to the uppermost portion of umbrella apparatus 901. In this embodiment, a cooling system 921 comprising a misting system 931 is provided for connection at a different location to umbrella apparatus 901. Power unit 955 includes a solar collector 957 at its uppermost portion. Solar collector 957 is preferably carried by a top portion 903 of power unit 955. A bottom portion 905 of power unit 955 defines an interior battery compartment 907. Additionally, power unit 955 carries a coupling mechanism 959 to allow coupling between power unit 955 and a pole portion 919 of umbrella apparatus 901, pole portion 919 being adapted at an upper end 911, preferably with threads 913, to releasably receive power unit 955. A top cap 915 hingedly connects pole portion 919 to a canopy 917. The electrical components of umbrella apparatus 901 are entirely independent of any household electrical system. The power source, such as power sources 50, 150, and 250, carried by power unit 955 is utilized to energize cooling system 921. During daylight hours, solar energy is collected by solar panel 957 and is converted and utilized to recharge the rechargeable power source which is maintained within battery compartment 907.

Cooling system 921 is coupled at a desired location underneath canopy 917 to provide a cooling mist in the area surrounding umbrella apparatus 901. Cooling system 921 is conductively coupled to power unit 955 by wiring 909 that passes through the hollow interior of pole portion 919. Cooling system 921 is a misting system comprising a reservoir 925, or other water source, a pump 927, water feed lines 929, and mist nozzles 923. Pump 927 pressurizes and pumps the water from reservoir 925 through water feed lines 929 and out of mist nozzles 923, which are located at selected spaced intervals under canopy 917, at a selected flow rate. Reservoir 925 may be a conventional ice cooler, such that the mist is chilled water.

Referring now specifically to FIG. 9 in the drawings, an umbrella apparatus 1001 is illustrated. As is shown, a power unit 1055 is utilized to provide electrical power to an automated opening and closing system 1050. Power unit 1055 includes a solar collector 1027 at its uppermost portion. Solar collector 1027 is preferably carried by a top portion 1003 of power unit 1055. A bottom portion 1005 of power unit 1055 defines an interior battery compartment 1007. Additionally, power unit 1055 carries a coupling mechanism 1029 to allow coupling between power unit 1055 and a pole portion 1019 of umbrella apparatus 1001, pole portion 1019 being adapted at an upper end 1011, preferably with threads 1013, to releasably receive power unit 1055. A top cap 1015 hingedly connects pole portion 1019 to a canopy 1017. The electrical components of umbrella apparatus 1001 are entirely independent of any household electrical system. Automated opening and closing system 1050 is conductively coupled to power unit 1055 by wiring 1009 that passes through the hollow interior of pole portion 1019. The power source, such as power sources 50, 150, and 250, carried by power unit 1055 is utilized to energize automated opening and closing system 1050. During daylight hours, solar energy is collected by solar panel 1027 and is converted and utilized to recharge the rechargeable power source which is maintained within battery compartment 1007.

Automated opening and closing system 1050 is carried at the uppermost portion of pole portion 1019. Opening and closing system 1050 includes a motor 1021, a transmission 1023, a line winding shaft 1025, a pulley system 1031, and a cable system 1033. These components cooperate to open and close the umbrella in response to the receipt of a command signal. The command signal may be supplied by the actuation of a switch (see FIGS. 1-3) carried on pole portion 1019, or it may be a wireless signal received from a paired transmitter receiver system (see FIG. 5B).

Figure 10:
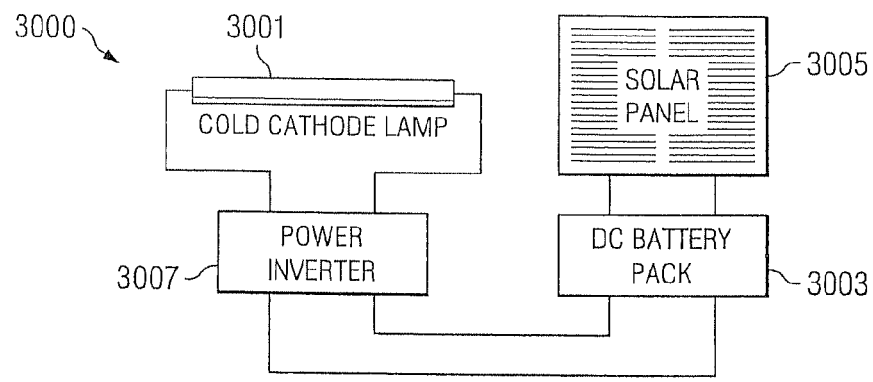
FIG. 10 is a schematic of one broad implementation of the present invention.

Referring now to FIG. 10 in the drawings, a schematic of the cold cathode tube lighting system of the present invention is illustrated. The invention is to utilize in combination a cold cathode lamp, a power inverter which supplies alternating current to the cold cathode lamp, a rechargeable DC battery pack, and a solar collector. This is depicted in simplified form in FIG. 10. This may be utilized in any outdoor application in which there is no easy or convenient access to household power. The system is entirely self-contained and does not require any household power for operation, or charging. As is shown, the cold cathode tube lighting system 3000 includes a cold cathode lamp 3001 that is supplied with AC power from a power inverter 3007. A DC battery pack 3003 includes rechargeable batteries that supply DC current to power inverter 3007. A solar collector 3005 is provided to recharge the batteries contained within DC power pack 3003.

A cold cathode tube is a lamp that produces light by the passage of an electric current through a vapor or gas maintained within a tube. A cold cathode tube does not require any heating above ambient temperature to produce light. The tube is phosphor coated on its inner surface, and thus may emit various colored light. In most cases, cold cathode tube lamps are low-pressure mercury vapor lamps. Such lamps use a 253.7 nanometer ultraviolet emission from mercury vapor excited by an electrical discharge through the lamp to charge the phosphors maintained on the wall of the lamp.

The optimum operating temperature for cold cathode tube is approximately 40 degrees Celsius, although Applicant believes that these lamps can be produced in a manner to reliably provide outdoor lighting in temperatures as cold as 15 degrees Fahrenheit. While the cold cathode tube does not require heating, the output of the lamp does vary based upon the ambient temperature. At room temperature, the initial output of a lamp is only about seventy percent of its steady state value at 40 degrees Celsius. In contrast, its output is only 25 percent when the lamp is started at zero degrees Celsius. Cold starts do require additional voltage from the power source to ensure reliable operation. However, the number of lamp "starts" has no adverse effect on the lamp. This is not true for fluorescent lamps, which degrade over time due to the number of "starts." Cold cathode tubes may be utilized to supply a white light output.

In the preferred embodiment, a cold cathode tube manufactured by Nanjing Lampus Electronics Company, Ltd. is utilized. Specifically, a lamp type CFL-20 is utilized. This has an inner diameter of 1.5 millimeters. The tube length is variable, and may be anywhere in the range of 50 millimeters to 30 millimeters in overall length. The tube is adapted to operate on four milliamps of tube current. The tube voltage is in the range of 200 to 750 Volts. The average brightness of this particular tube is 40,000 $cd/m^2$.

Another advantage of cold cathode tubes is that the tubes can be very thin in diameter. For example, in the preferred implementation, the cold cathode tube may be one or two millimeters in diameter. A cold cathode tube can be bent into any shape and can be formed in very long lengths, such as several feet long. Thus, cold cathode tubes provide greater light output per foot versus conventional lighting.

Another significant advantage of cold cathode tubes it that they have relatively long lamp life. It is not unusual to have lamp lives which are thirty to forty thousand hours of use. In other words, these cold cathode tubes have, for all practical purposes, an infinite life span.

They are low power devices. They do not generate a lot of heat. They provide high lumen output. For these reasons, fewer batteries are needed to drive the cold cathode ray tube, and smaller solar cell panels may be utilized to recharge the batteries. In other words, relatively small form factors can be achieved because the solar cells, the batteries, and the bulbs can be relatively small in size.

The present invention can be implemented on a small, medium, or large scale so the solar cell panels and batteries may be moved up in size to either provide greater light output or to provide for a longer useful life.

Additionally, the present invention may be considered to satisfy three separate and distinct outdoor lighting applications, all of which may be incorporated into the umbrella apparatus of the present invention.

The first application is that of a "special purpose light," or "task light," such as for security applications. These special purpose lights would provide very light output, for a relatively short duration. One example would be the utilization of the cold cathode ray tube to provide extremely high light output for a very small area for a very short time, all in response to detection of motion in a particular area. For example, a system can be configured to detect motion in a doorway, motion in a yard, motion in a driveway, or the like. The brightness can be provided which can be far in excess of 40,000 $cd/m^2$. For example, 100,000 to 200,000 $cd/m^2$ may be provided for a very small area for a very short duration. For example, the duration may be a few minutes to ten minutes.

The second application requires a medium amount of light output, but requires longer periods of operation or wider areas of coverage. For example, the light assembly provided with the umbrella provides a relatively high light output, such as in the range of 20,000 to 100,000 $cd/m^2$, in order to allow one to read, play games, operate a computer, or do needlework under the umbrella. Preferably, the battery pack and associated solar panel is sufficient to allow the system to operate continuously for a time interval in the range of 8-12 hours. Additionally, and preferably, the solar panel should be of the size and output which is sufficient to fully recharge the battery pack during the daylight hours.

A third application requires a lower level of light intensity. A good example would be lawn, patio, walkway, or landscape lighting. One does not ordinarily expect to be able to read or do intricate work under this type of lighting. In contrast, all that is expected is that a reasonable amount of light be provided to allow one to walk safely through an area. This type of task may require brightness in the range of 6,000 $cd/m^2$ to 60,000 $cd/m^2$.

Figure 11:
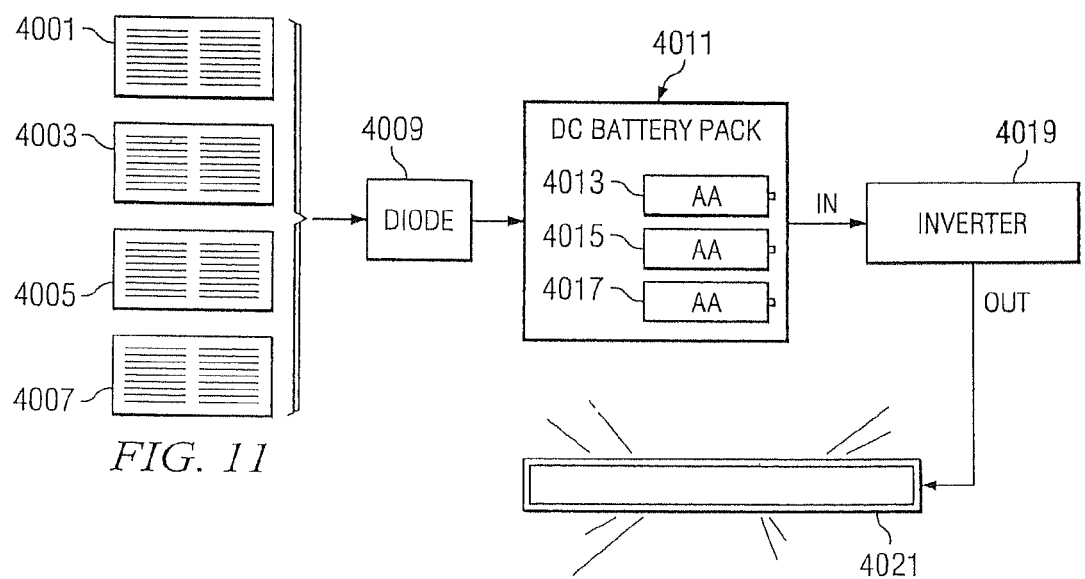
FIG. 11 is a block diagram representation of the present invention.

Referring now to FIG. 11 in the drawings, a block diagram representation of the application of the present invention to a lawn lighting scenario is illustrated. In this scenario, a plurality of solar panels 4001, 4003, 4005, and 4007 are connected together in series. Preferably, solar panels 4001, 4003, 4005, and 4007 are manufactured by Siemens and comprise monocrystal solar panels, each providing 1.5 Volts. The total current for the array of solar panels is about 80 milliamps. The current from solar panels 4001, 4003, 4005, and 4007 is passed through a diode 4009 and then to a battery pack 4011. Battery pack 4011 includes a plurality of batteries 4013, 4015, and 4017, for example three AA batteries. In alternative embodiments, as few as two batteries may be used. As is shown, each battery is a 1.2 Volt Nickel Cadmium battery. They collectively provide 700 milliamp hours of power.

The output of DC battery pack 4011 is provided as an input to an inverter 4019. Inverter 4019 receives 4.8 Volts DC in and produces as an output of 800 Volts rms AC at 40 Hertz. The total current of the output is 4-6 milliamps.

This is provided to the cathode of a cold cathode ray tube lamp 4021. The current passes through the vapor maintained within cold cathode ray tube lamp 4021 and causes electrons to be stripped from the gas. These electrons collide with the phosphorus coating on the interior surface of cold cathode ray tube lamp 4021, thereby emitting light.

Figure 12:
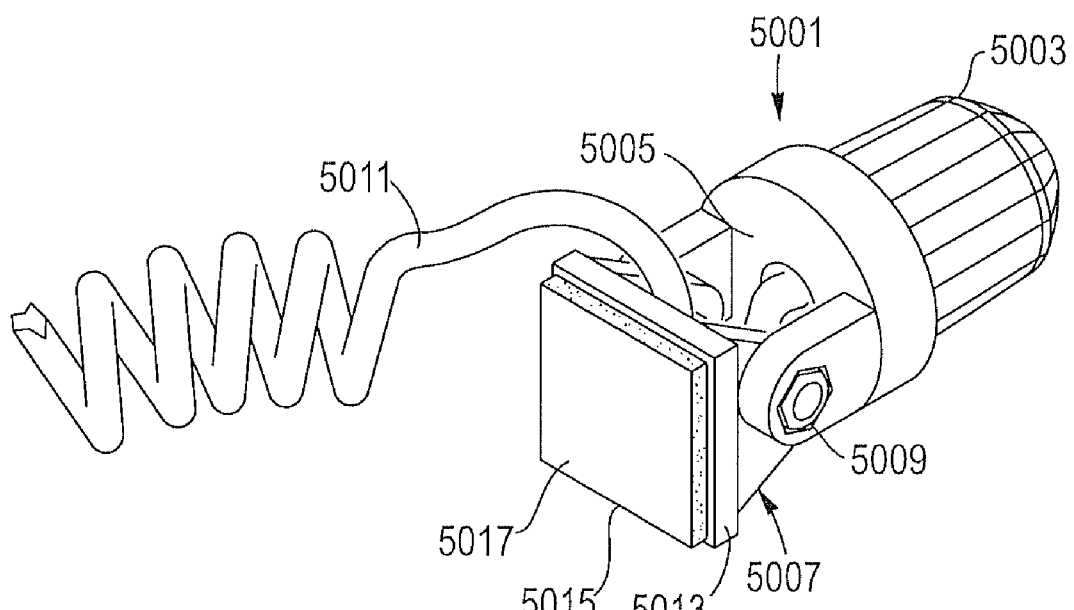
FIG. 12 is a perspective view of a lamp module according to the invention and adapted for mounting on an umbrella apparatus using an adhesive pad.

Referring now to FIG. 12, a lamp module 5001 is adapted for attachment to a portion of the umbrella apparatus of the present invention. Lamp module 5001 comprises a lamp 5003, which may be of any type described herein, mounted to a housing 5005 that is preferably pivotally connected to a mounting bracket 5007. Housing 5005 pivots about shaft 5009, allowing lamp 5003 to be rotated to a selected position for directing the light output of lamp 5003 in a desired direction. Wire 5011 is conductively connected to lamp 5003 for providing electrical power to lamp 5003. Mounting bracket 5007 has a planar mounting plate 5013 adapted to be fixedly attached to an adhesive pad 5015 or similar connector for mounting lamp module 5001 to the umbrella apparatus. To install lamp module 5001, an adhesive surface 5017 of pad 5015 is placed against a surface (not shown) of the ribs, support struts, or canopy of the umbrella, affixing lamp module 5001 in a desired position on the umbrella. Housing 5005 may then be rotated about shaft 5009 to move lamp 5003 to the desired orientation. This method of mounting is advantageous, since lamp module 5001 may be easily installed on or removed from an umbrella, allowing lamp modules 5001 to be pre-installed on an umbrella prior to sale of the umbrella or sold separately and fitted to a user's existing umbrella.

Figure 13:
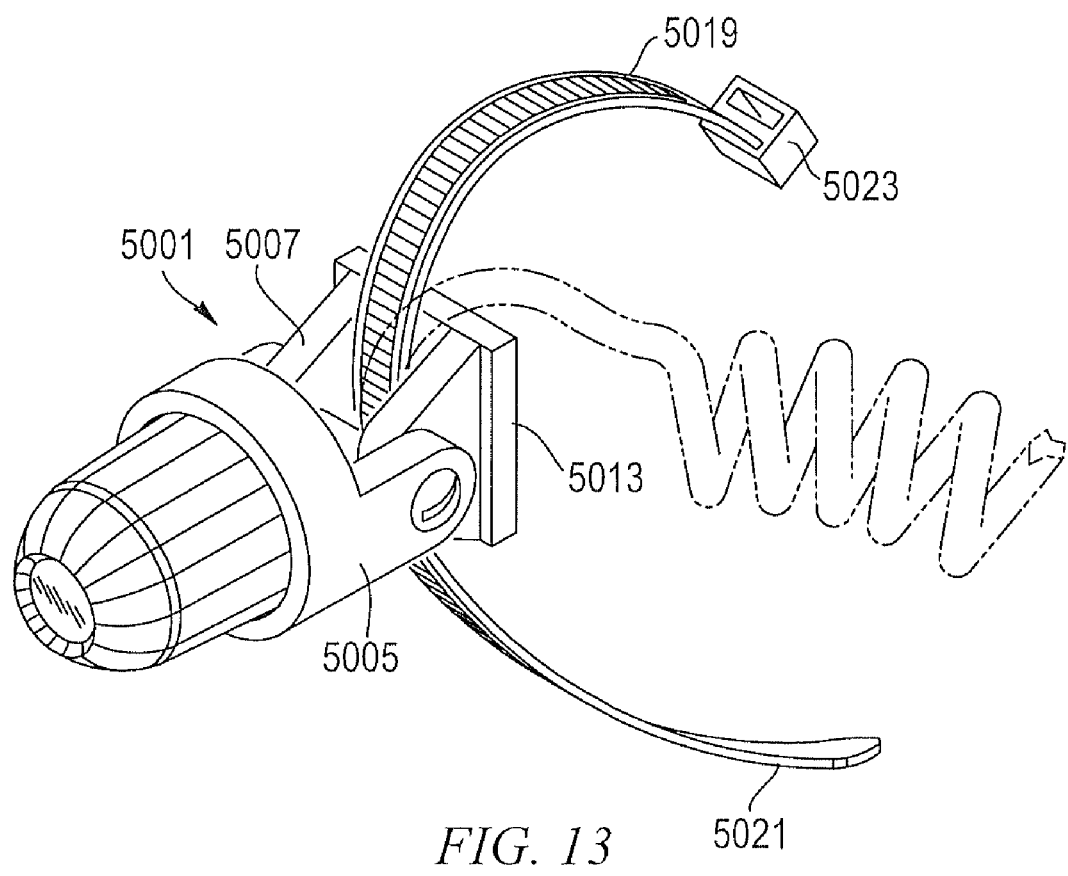
FIG. 13 is a perspective view of the lamp module of FIG. 12 and shows a wire tie inserted for use in mounting the lamp module.

In FIG. 13, an alternative method of attaching lamp module 5001 is illustrated. A wire tie 5019, commonly called a zip tie, is inserted between housing 5005 and mounting bracket 5007 for affixing module 5001 to a portion of an umbrella according to the invention. To install lamp module 5001, mounting plate 5013 is placed near a surface of a rib, strut, or other portion of the umbrella, then end 5021 of wire tie 5019 is inserted into a latching member 5023. Wire tie 5019 encircles mounting plate 5013 and the desired portion of the umbrella, and end 5021 is pulled through latching member 5023, drawing mounting plate 5013 adjacent the surface of the portion of the umbrella.

Figure 14A:
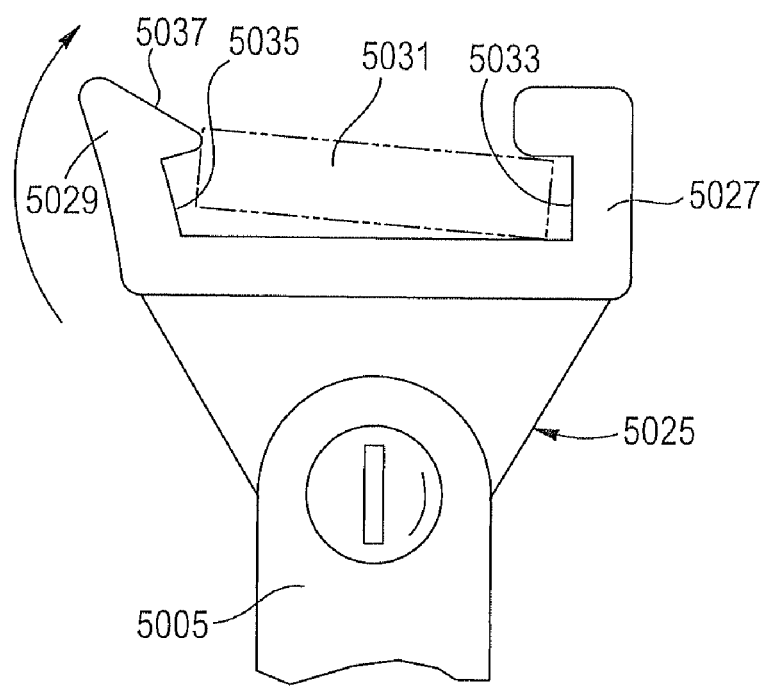
FIG. 14A is a side view of an alternative mounting bracket according to the invention and optionally used to mount the lamp module of FIG. 12 to a rib of an umbrella apparatus.
Figure 14B:
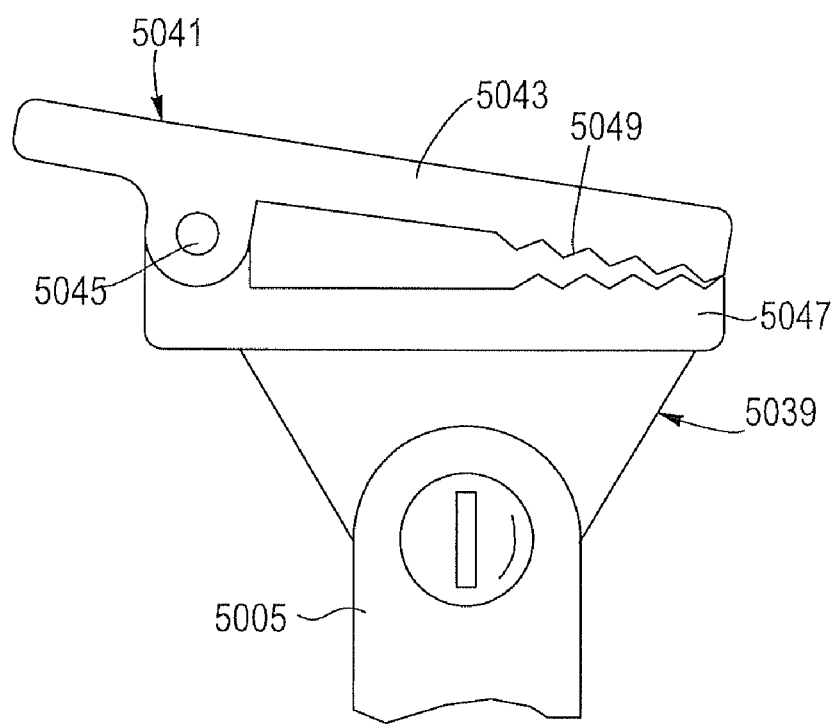
FIG. 14B is a side view of a second alternative mounting bracket according to the invention and optionally used to mount the lamp module of FIG. 12 to a rib of an umbrella apparatus.

Additional methods of attaching lamp 5003 are illustrated in FIGS. 14A and 14B. Housing 5005 is shown pivotally mounted to a mounting bracket 5025, which has a U-shaped channel formed by protruding members 5027, 5029 for latching mounting bracket 5025 to a planar portion of the umbrella, such as rib 5031. Protruding members 5027, 5029 form recesses 5033, 5035, respectively, for receiving lateral edges of rib 5031 and affixing mounting bracket 5025 adjacent rib 5031. Member 5029 has a ramped surface 5037 to allow the user to "snap" rib 5031 into mounting bracket 5025. To install mounting bracket 5025, the user inserts one lateral edge of rib 5031 into recess 5033 and places the other lateral edge of rib 5031 against ramped surface 5037. The user then forces rib 5031 and mounting bracket 5025 toward each other, the lateral edge of rib 5031 sliding along ramped surface 5037 and deforming protruding member 5029 outward until the lateral edge enters recess 5035. To remove mounting bracket 5025 from rib 5031, the user pulls member 5029 outward until the lateral edge of rib 5031 is released from recess 5035, freeing mounting bracket 5025 from rib 5031.

FIG. 14B shows a mounting bracket 5039 having a spring-biased clamp 5041 for pivotally attaching housing 5005 to a portion of the umbrella. Clamp member 5043 is connected by shaft 5045 to a clamp plate 5047, clamp member 5043 and clamp plate 5047 cooperating to retain mounting bracket 5039 on a rib, strut, or other portion of the umbrella. As shown, one or both of member 5043 and plate 5047 may have teeth 5049 for assisting clamp 5041 in gripping the portion of the umbrella to which bracket 5039 is mounted.

Figure 15:
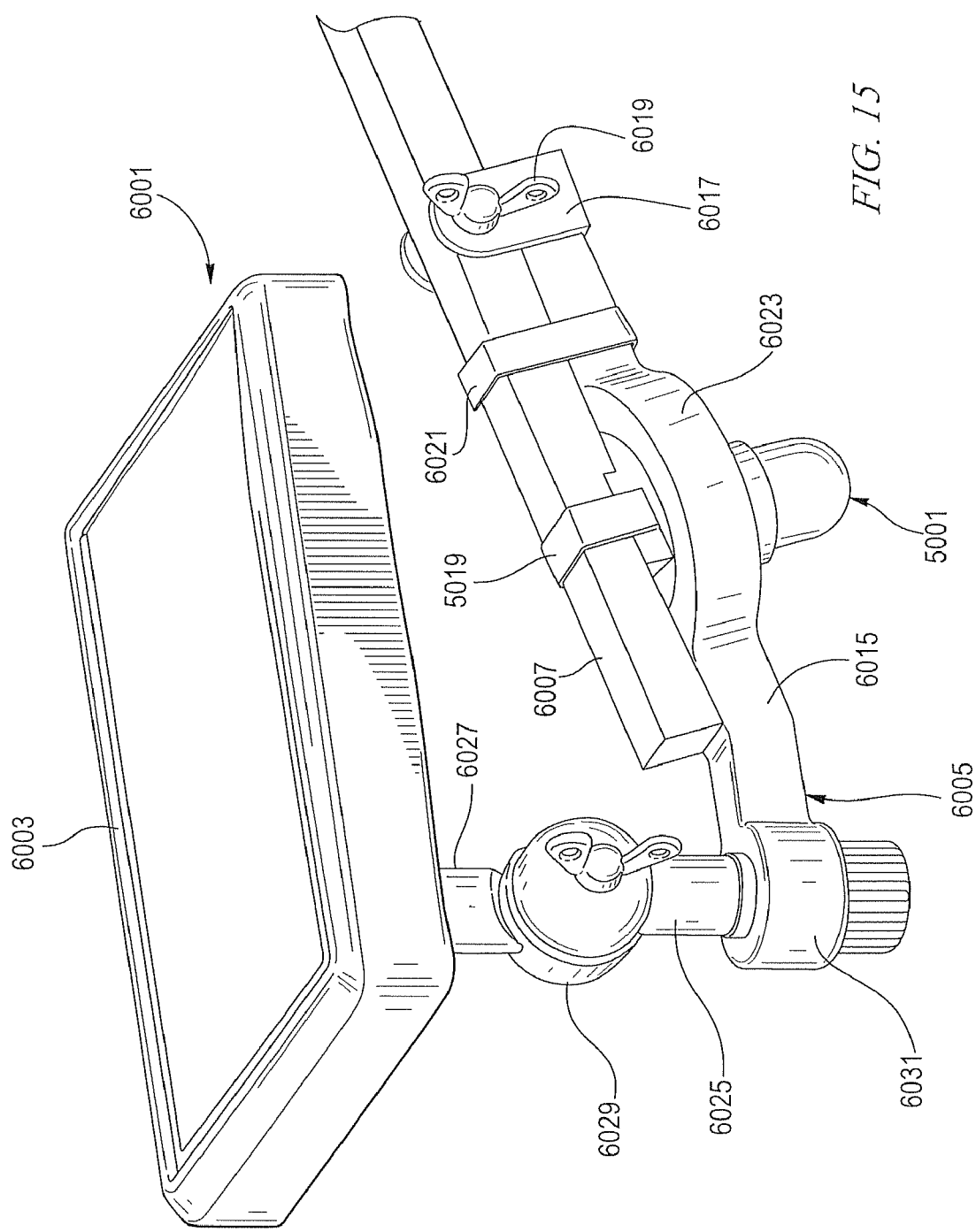
FIG. 15 is a perspective view of a solar collector module according to the invention and attached to a rib of an umbrella apparatus.
Figure 16:
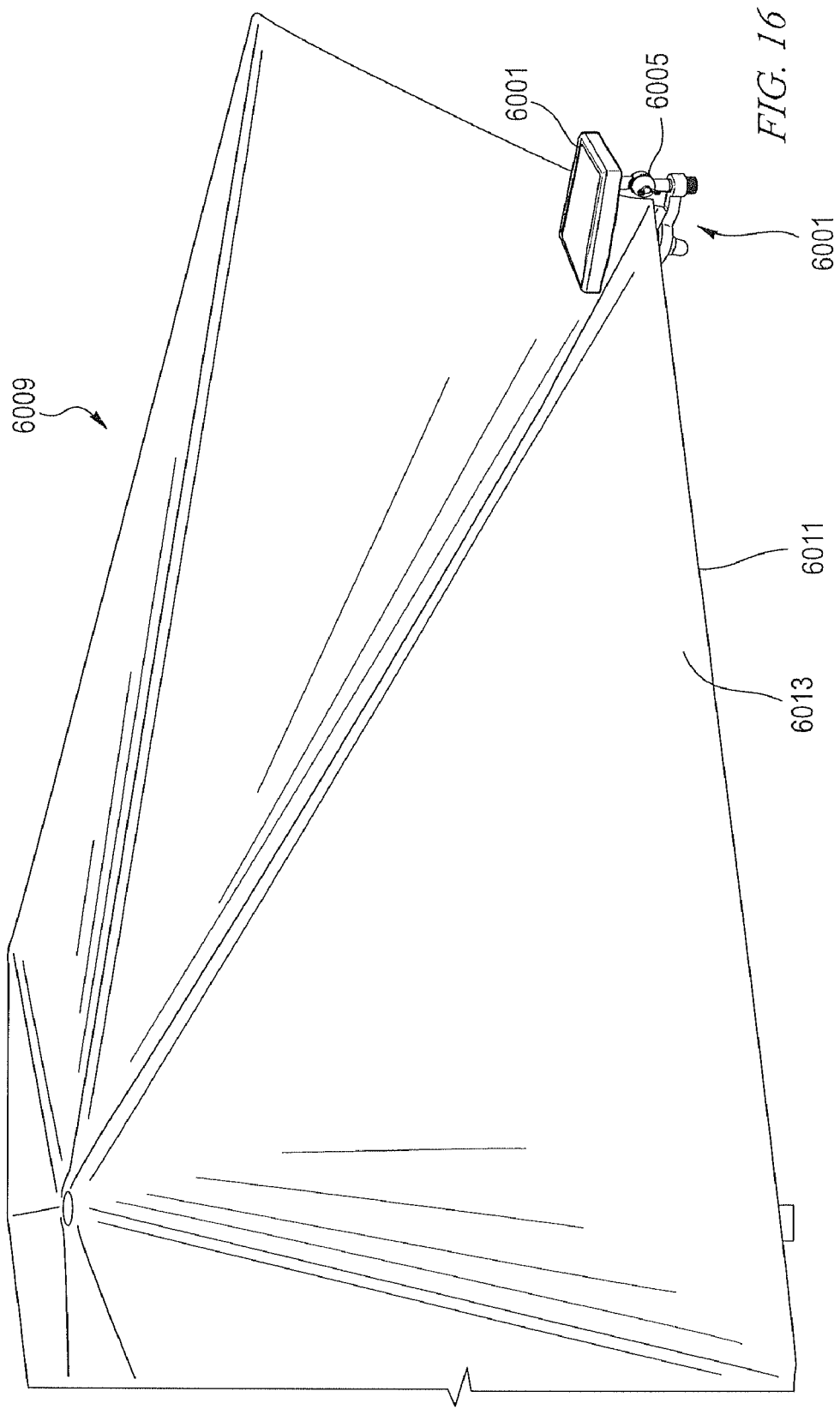
FIG. 16 is a perspective view of the solar module of FIG. 15 installed on an umbrella apparatus and viewed from above.
Figure 17:
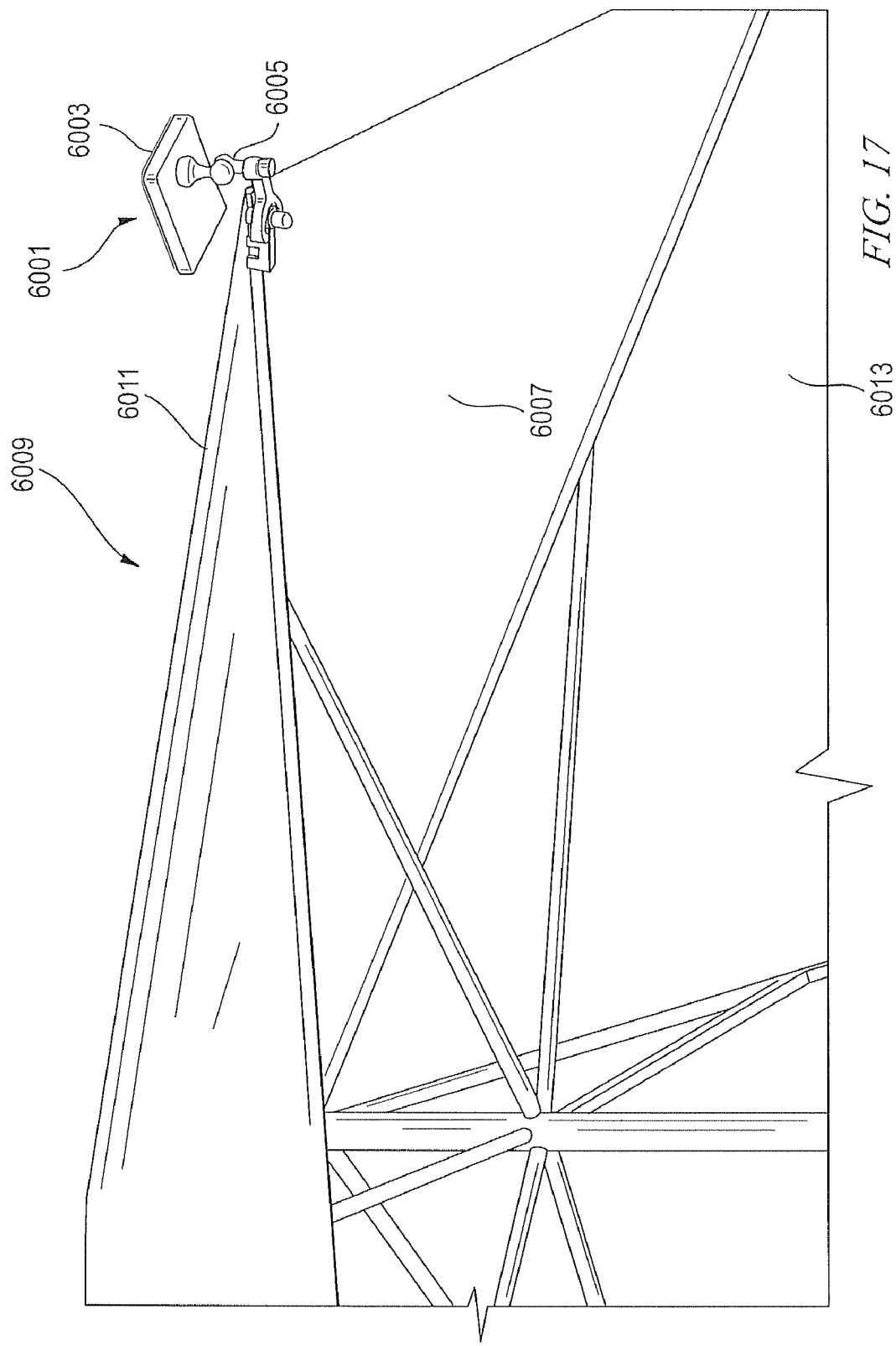
FIG. 17 is a perspective view of the solar module of FIG. 15 installed on an umbrella apparatus and viewed from below.

An alternative embodiment for providing solar power to operate devices or recharge batteries on the umbrella apparatus is shown in FIGS. 15 through 17. Referring to the figures, solar module 6001, which comprises solar cell array 6003 and bracket 6005, is connected to rib 6007 of umbrella 6009 (FIGS. 16 and 17). Bracket 6005 is "L"-shaped for placing array 6003 above a peripheral edge 6011 of canopy 6013 when solar module 6001 is installed, as shown in FIG. 16, allowing light to strike array 6003 unencumbered by canopy 6013. A generally horizontal section 6015 of bracket 6005 extends parallel and adjacent to an outer portion of rib 6007, with a clevis 6017 on bracket 6005 being secured to rib 6007 with a screw and wingnut clamp combination 6019 or a similar retaining fastener. Optionally or additionally, a wire tie 6021 may encircle rib 6007 and a portion of horizontal section 6015 for securing bracket 6005 to rib 6007. An optional ring 6023 is formed in horizontal section 6015 to provide clearance for a lamp, such as 5001 (FIGS. 12 and 13), to be installed near the outer end of rib 6007 using a wire tie 5019.

Bracket 6005 also has a generally vertical section comprised of members 6025 and 6027, which are pivotally connected to each other at hinge 6029. Solar cell 6003 is mounted on an upper end of member 6027, and a lower end of member 6025 is rotatably mounted to the outer end 6031 of horizontal section 6015. Hinge 6029 provides the ability to alter the angle of solar cell 6003 in relation to a horizontal plane, and solar cell 6003 can be rotated about the vertical axis of member 6025 relative to horizontal section 6005. This allows the user to selectively position solar cell 6003 to a desired position for maximizing the amount of light striking solar cell 6003 without the need for repositioning umbrella 6009. Solar module 6001 can be used to provide electrical power to any type of device attached to umbrella 6009, such as lights, cooling devices, or other types of electrical devices, or to recharge batteries. While only one solar module 6001 is shown attached to umbrella 6009 in the figures, modules 6001 may be mounted on any number of ribs 6007. Also, though bracket 6005 is shown having a generally "L"-shaped form, bracket 6005 may be formed to have other shapes, including that of a "V" or a "U." Alternatively, bracket 6005 may be generally straight for positioning solar cell 6003 outward of the peripheral edge of canopy 6013. Solar module 6001 may be pre-installed on umbrella 6009 or may be sold separately in kit form for installation by a user.

Figure 18:
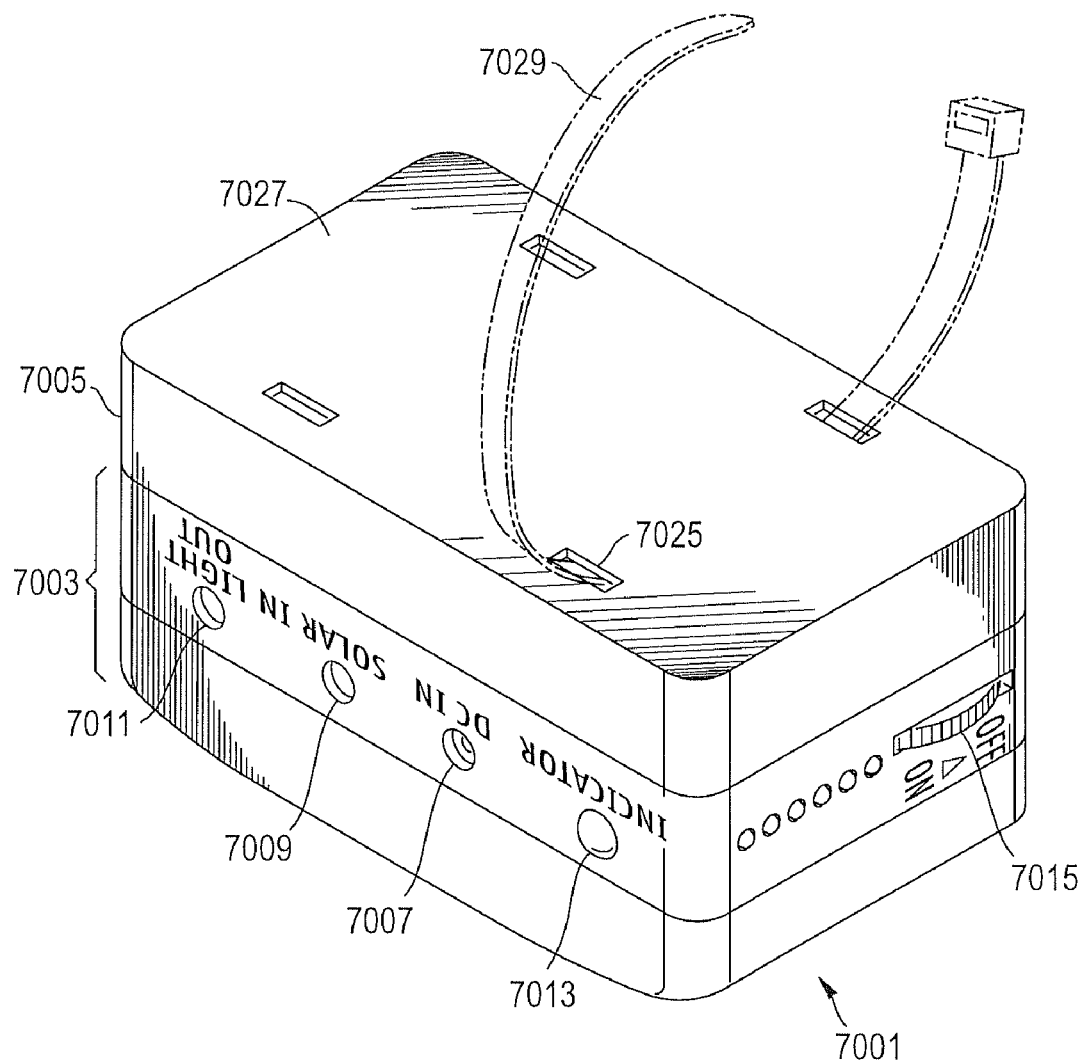
FIG. 18 is a perspective view of a battery module according to the invention and adapted for mounting on an umbrella apparatus using wire ties or similar connectors.
Figure 19:
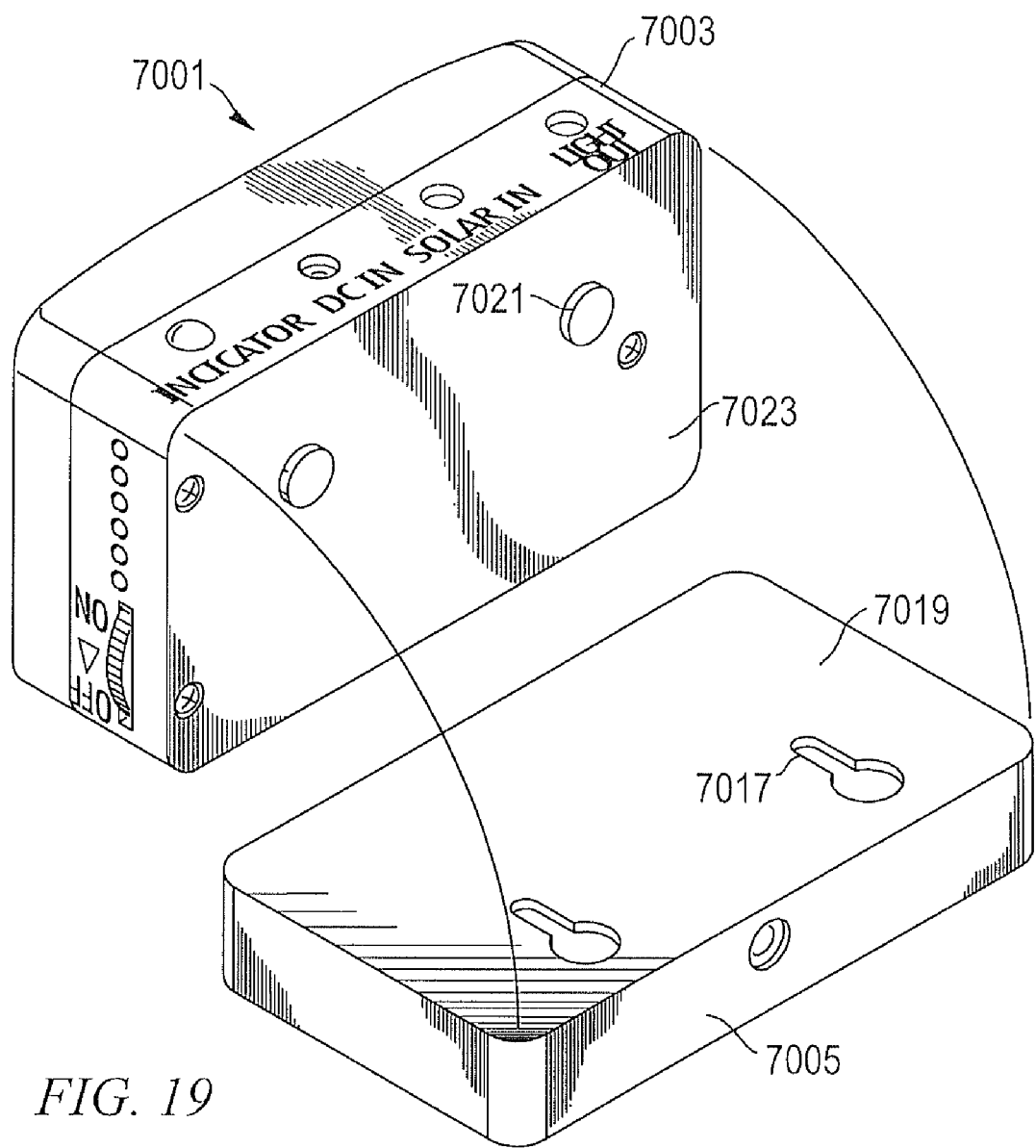
FIG. 19 is an exploded perspective view of the battery module of FIG. 18 showing the battery pack disassembled from the mounting bracket.

Referring now to FIGS. 18 and 19, a battery module 7001, which is preferably water-resistant, is adapted for use on an umbrella apparatus of the invention for providing electrical power to devices such as lights, misters, etc., as described herein. Battery module 7001 comprises a rechargeable battery pack 7003 that is preferably removably secured to a mounting bracket 7005, and mounting bracket 7005 is adapted to be attached to a portion of an umbrella, such as a rib, strut, pole, or other portion. Battery module 7001 may be pre-installed on an umbrella prior to sale of the umbrella or may be sold separately or in a kit for installation on an existing umbrella. For example, the kit may contain a battery module 7001 and a plurality of lamp modules 5001 or other electrical devices (e.g., misters, fans) powered by battery module 7001. Additionally, items in the kit may be adapted for use on other outdoor structures, including a deck, a gazebo, a plant, a table, a stairway, a hand rail, an awning, a roof, an arbor, a fence, a birdbath, a walkway, a retaining wall, and landscape edging.

Battery pack 7003 has a set of connectors 7007, 7009, 7011 for connecting electrical sources for recharging pack 7003 and for connecting electrical loads for pack 7003 to provide electrical power. Connector 7007, labeled as "DC IN," is used to connect a direct-current (DC) power source to battery pack 7003. This DC source may be used to recharge battery pack 7003, or it may be used in conjunction with battery pack 7003 to power electrical devices connected to pack 7003. Examples of DC sources include power supplied from a power converter plugged into an alternating-current (AC) source, such as a wall outlet, and power supplied from an additional battery connected to battery pack 7003. Connector 7009, labeled as "SOLAR IN," is optional and used to connect battery pack 7003 to a power source derived from a solar cell, such as those described above. Connector 7011, labeled as "LIGHT OUT," is for connecting devices requiring power to battery pack 7003. An indicator light 7013 may be used for various functions, including indicating the charge of battery pack 7003, indicating "power on," or indicating that power is being supplied to DC IN connector 7007 or SOLAR IN connector 7009. Battery pack 7003 also comprises an on/off switch 7015, which may also act as a dimmer, to control power output through LIGHT OUT connector 7011. Switch 7015 may be of a type that allows for remote operation, such as through use of a wireless remote control device.

In this embodiment, mounting bracket 7005 is a "dumb" bracket, such that bracket 7005 provides only a means for mounting battery pack 7003 to an umbrella and does not include any of the operational controls or connectors found on battery pack 7003. FIG. 19 shows one method of attachment for securing battery pack 7003 to mounting bracket 7005. Slotted holes 7017 are provided in surface 7019 of bracket 7005 for receiving studs 7021 protruding from surface 7023 of battery pack 7003. To attach battery pack 7003 and bracket 7005, each stud 7021 is inserted into an enlarged section of one of holes 7017, and then battery pack 7003 is moved laterally to engage each stud 7021 in a narrow section of holes 7017 and align the outer edges of surfaces 7019 and 7023, which are adjacent. Removal of battery pack 7003 is accomplished by reversing the attachment procedure.

Figure 20:
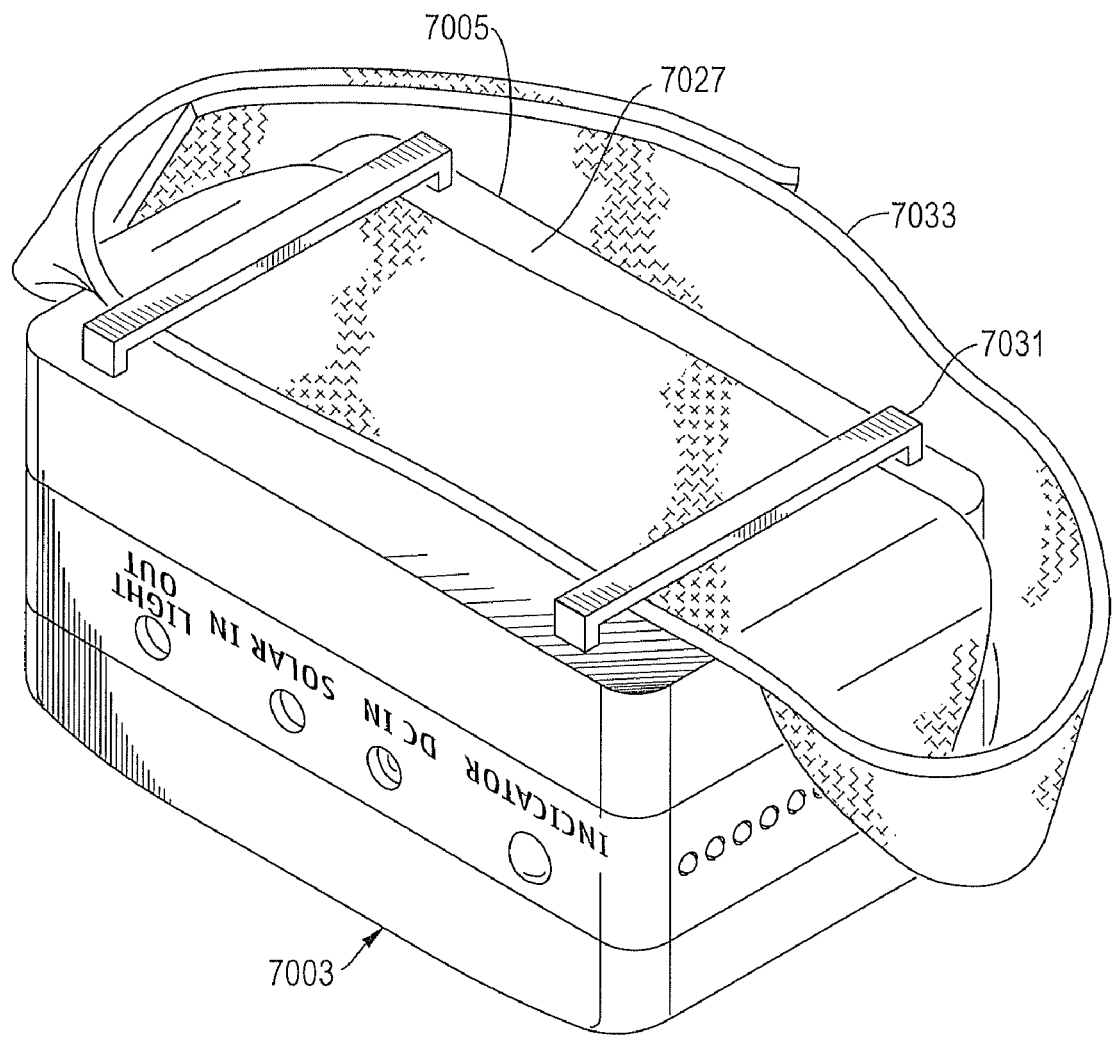
FIG. 20 is a perspective view of the battery module of FIG. 18 with an alternative attachment means for securing the mounting bracket to an umbrella apparatus.
Figure 21:
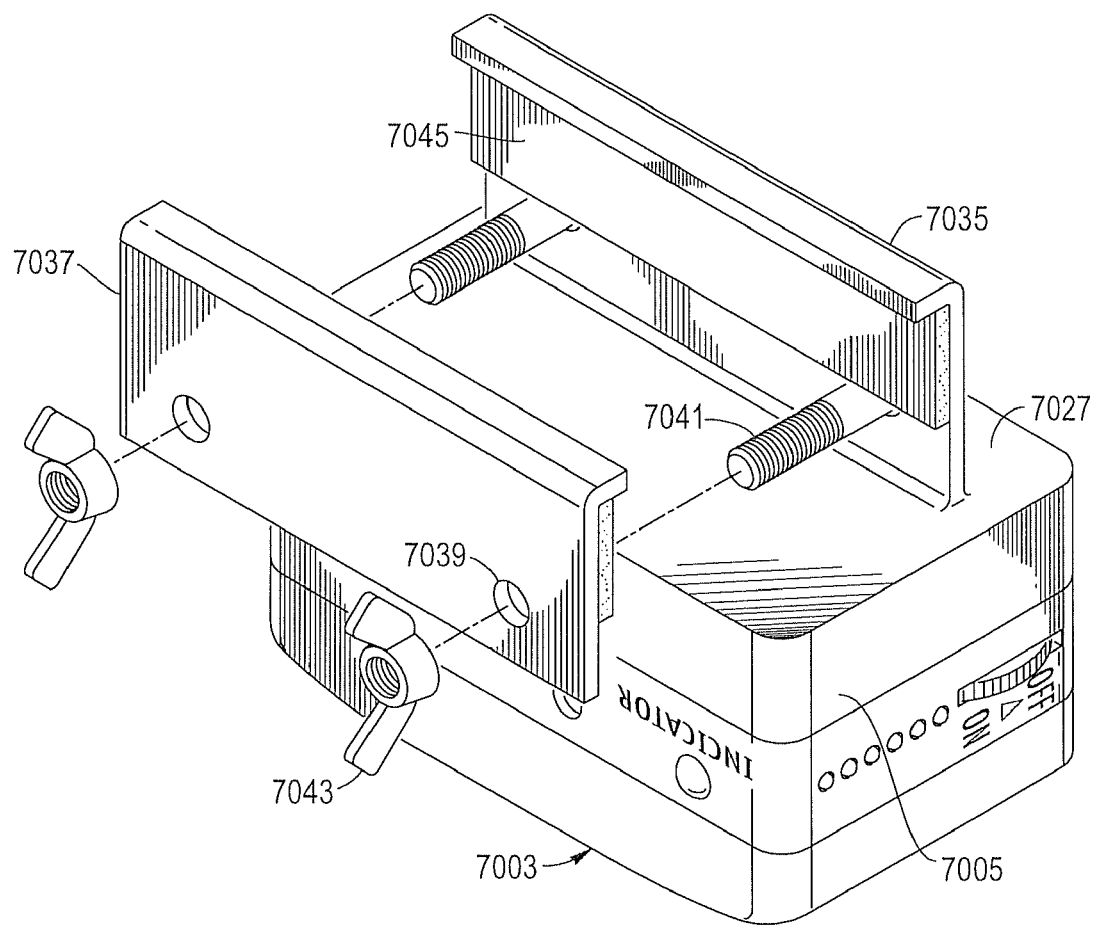
FIG. 21 is a perspective view of the battery module of FIG. 18 with a second alternative attachment means for securing the mounting bracket to an umbrella apparatus.

Referring again to FIG. 18 and to FIGS. 20 and 21, mounting bracket 7005 may be attached to the umbrella apparatus using a number of conventional methods, three of which are illustrated in the figures. In FIG. 18, pairs of holes 7025 are formed in surface 7027 of bracket 7005, each pair being adapted to receive a wire tie 7029 (shown in phantom) for securing bracket 7005 to a portion of an umbrella apparatus. While shown in one orientation, holes 7025 may be configured in any orientation required for the application. For example, wire ties 7029 may be oriented to be perpendicular or at other angles to the direction shown. To mount bracket 7005, wire ties 7029 are used to encircle a portion of the umbrella apparatus and draw surface 7027 adjacent that portion.

In FIG. 20, mounting bracket 7005 is shown with a pair of loops 7031 protruding from surface 7027. A strap 7033, which may be formed from fabric or similar flexible materials, extends through loops 7031 for encircling a portion of an umbrella apparatus when the ends of strap 7033 are connected to each other. The ends of strap 7033 preferably have hook and loop fasteners, though other means may be used, such as snap closures or similar fasteners. Loops 7031 may alternatively be oriented in any desired direction relative to mounting bracket 7005.

A second alternative embodiment of mounting bracket 7005 is shown in FIG. 21, in which a two-part C-clamp comprises a clamp member 7035 extending from surface 7027 of bracket 7005 and a cooperating clamp member 7037. Clamp member 7037 has holes 7039 for receiving threaded studs 7041 protruding from member 7035. Member 7037 is retained on studs 7041 by wingnuts 7043 or similar fasteners. A lining material 7045, which may be elastomeric or formed from similar materials, is located on the inner surfaces of members 7035, 7037 for increasing the friction between members 7035, 7037 and the portion of an umbrella apparatus to which bracket 7005 is attached. Lining material 7045 may also prevent marring or other damage to the portion of the umbrella apparatus.

Figure 22:
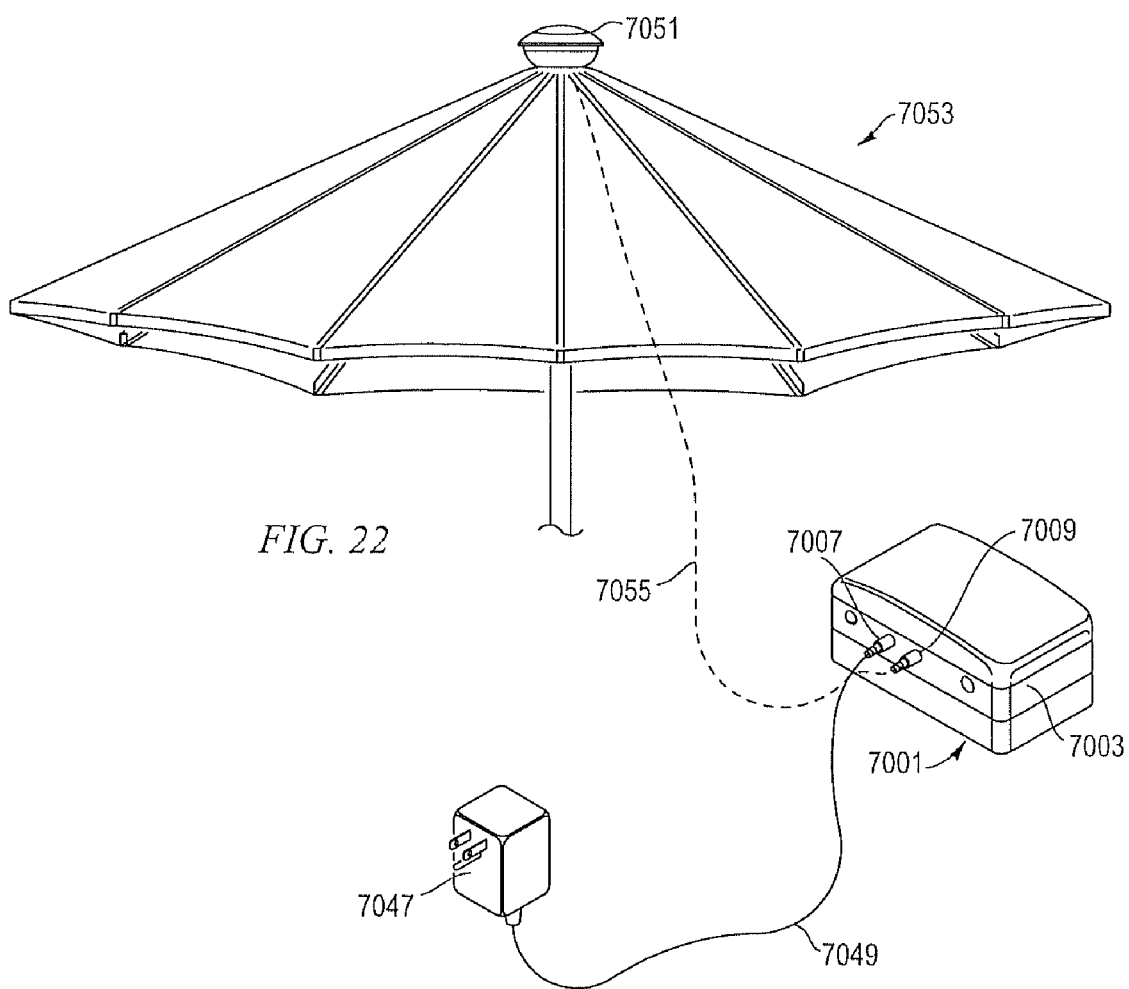
FIG. 22 is a perspective view illustrating the use according to the invention of a recharging system adapted to be connected to an alternating current power source and the optional use of a solar power recharging system.

As discussed above, FIG. 22 illustrates the preferred methods for providing power to battery module 7001. A power converter 7047 is adapted to plug into a standard electrical outlet for converting the AC power to DC power, which is then carried through wire 7049 to connector 7007 on batter pack 7003. An alternative source of power may be provided through an optional solar system, in which a solar collector 7051, which is mounted on umbrella apparatus 7053, produces power carried through wire 7055 to connector 7009 on battery pack 7003.

Figure 23:
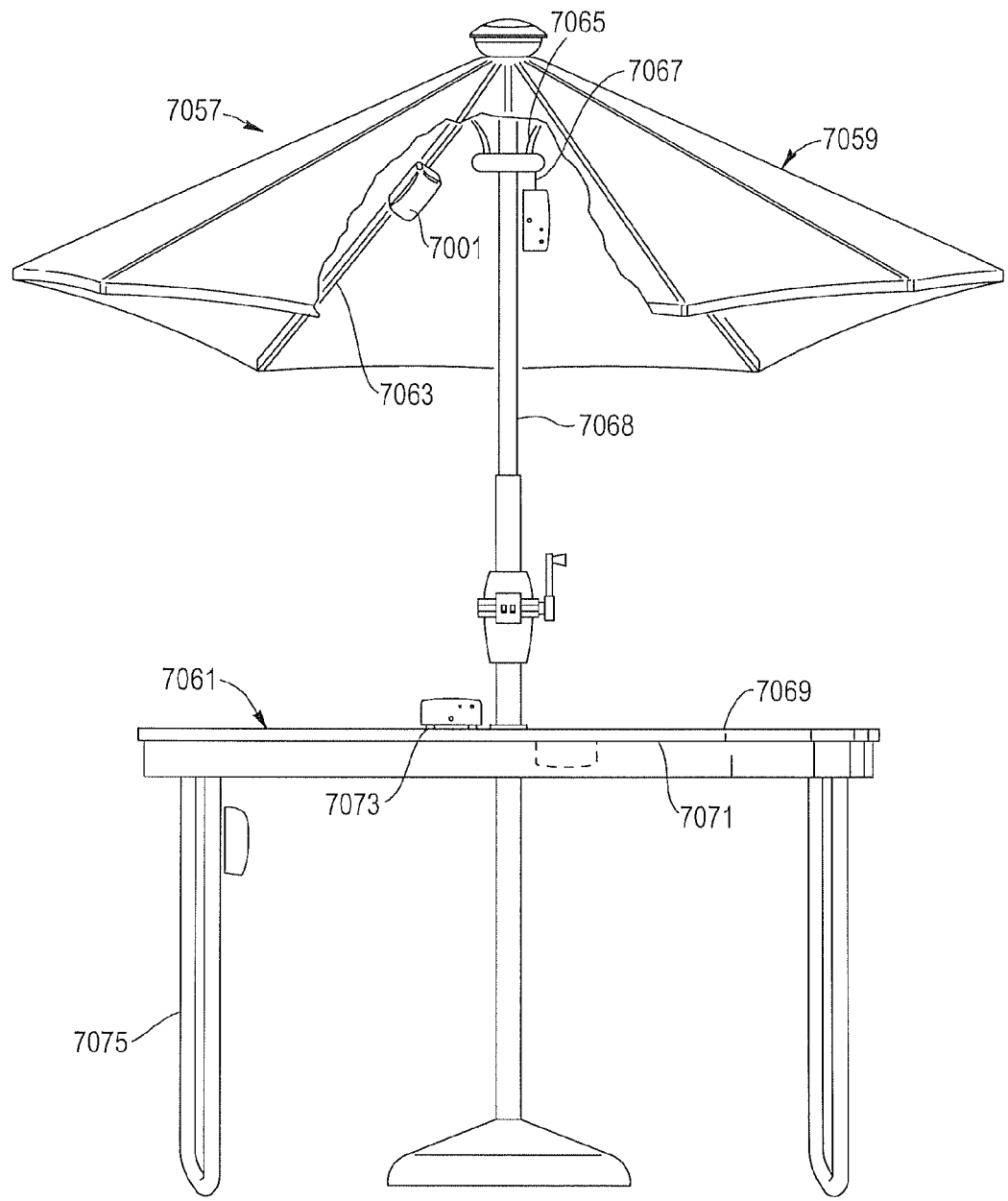
FIG. 23 is a perspective view showing various locations according to the invention for mounting the battery module of FIG. 18 on an umbrella apparatus.

Battery module 7001 may be located in various locations on an umbrella apparatus, as shown in FIG. 23. Umbrella apparatus 7057 comprises an umbrella portion 7059 and an optional table portion 7061. Preferred locations for locating battery module 7001 on umbrella portion include a location along a rib 7063, on a support strut 7065, and dangling from a flexible strap or other connector 7067, preferably located adjacent pole 7068. These locations place battery module 7001 above the user area beneath umbrella portion 7059, yet the placement allows the umbrella to open and close without interference. Preferred locations on table portion 7061 include the upper surface 7069 of the tabletop or suspended from its lower surface 7071, as shown. When located on upper surface 7069, battery module 7001 may be attached by means such as those described above, or module 7001 may be resting on the surface. In the latter case, module 7001 preferably has feet 7073 protruding from a lower surface of battery module 7001, and feet 7073 may be elastomeric to minimize sliding of module 7001 on surface 7069. When located on lower surface 7071, module 7001 may be attached using methods described above or may be affixed using adhesives, such as with two-sided adhesive pads or tape. An additional location for mounting battery pack 7001 is on table leg 7075.

Figure 24:
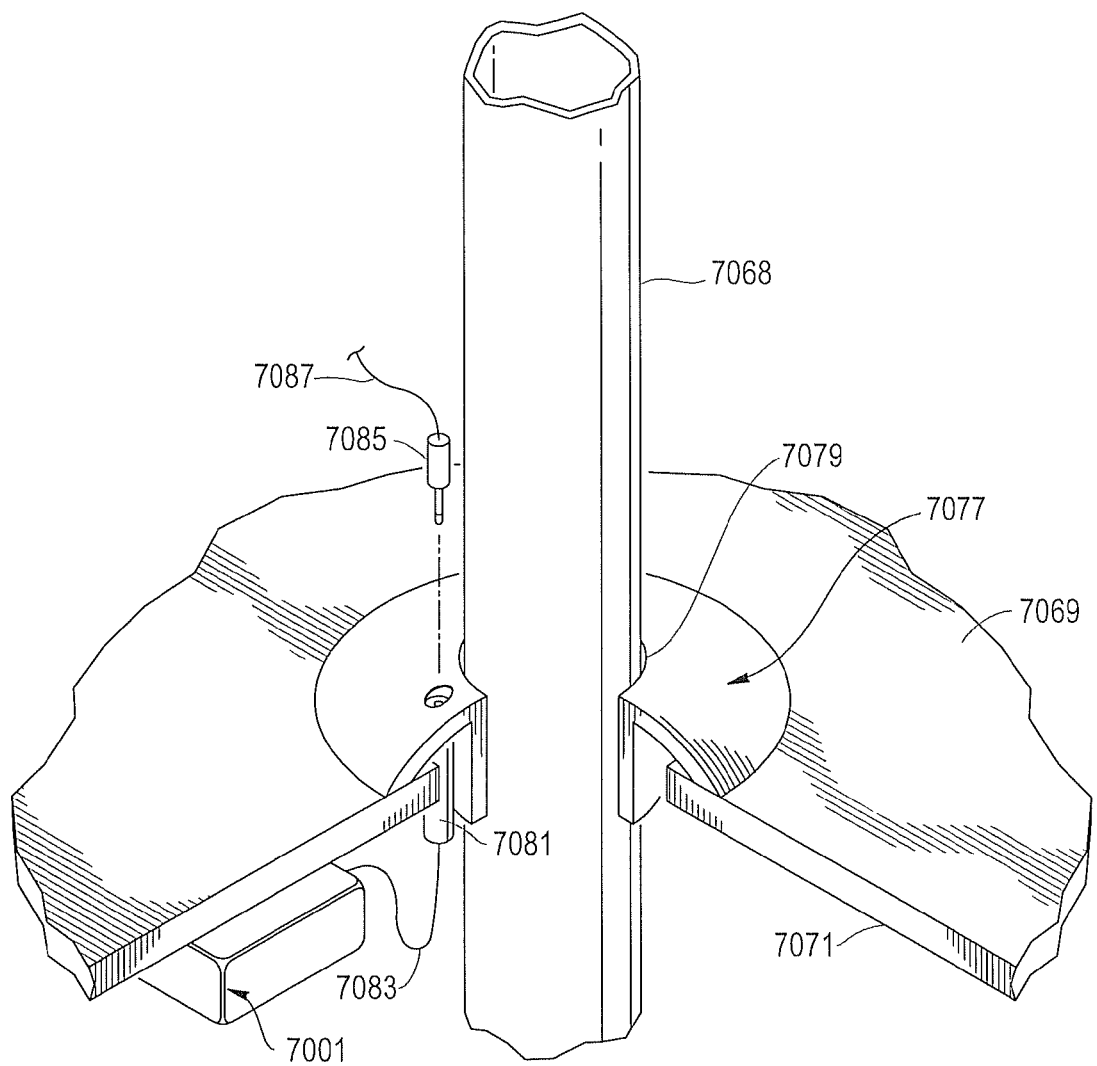
FIG. 24 is a perspective view of a spacer according to the invention used to provide electrical connection to a battery module mounted under a table of an umbrella apparatus.
Figure 25:
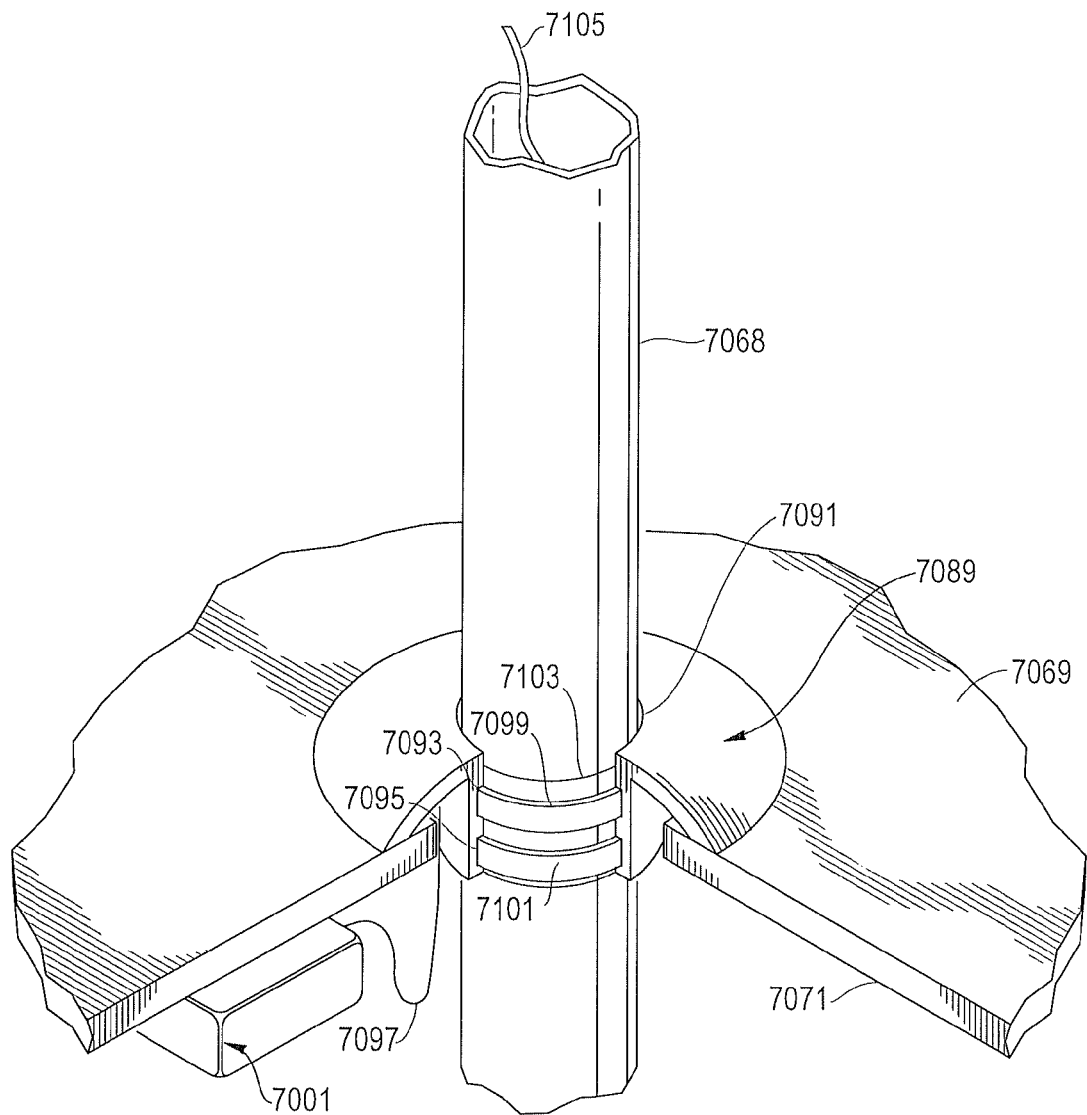
FIG. 25 is a perspective view of an alternate embodiment of a spacer according to the invention used to provide electrical connection to a battery module mounted under a table of an umbrella apparatus.

FIGS. 24 and 25 illustrate methods of providing electrical power to lights or other devices on umbrella portion 7059 when battery pack is located on lower surface 7071 of table portion 7061. FIG. 24 shows a spacer 7077 located between pole 7068 and the inner edges of surfaces 7069, 7071. A cylindrical aperture in the center of spacer 7077 is adapted to receive pole 7068. A female electrical connector 7081 extends through spacer 7077 from a lower portion of spacer 7077, and battery module 7001 is conductively connected to connector 7081 through wire 7083. A male electrical connector 7085 is sized to be received within an opening on an upper portion of female connector 7081, and a wire 7087 extends from male connector 7085 to lights or other electrical devices mounted on umbrella portion 7059 (FIG. 23). Alternatively, spacer 7077 may have an integral conduit allowing wire 7083 or wire 7087 to pass through spacer 7077. The advantage to this embodiment is that battery module 7001 may be installed beneath the table where it is out of view, and umbrella portion 7059 may be removed by simply unplugging male connector 7085, without the need to unplug battery module 7001 from spacer 7077.

An alternative embodiment allowing placement of battery module 7001 on lower surface 7071 is shown in FIG. 25. Spacer 7089 also has a central aperture 7091 for receiving pole 7068, but aperture 7091 contains conductive elements 7093, 7095, which may be circumferential, as shown, and are connected to battery module 7001 by wire 7097. It will be understood that all of spacer 7089, or at least a central portion, will be formed of nonconductive materials to prevent short circuiting between elements 7093, 7095. Cooperating elements 7099, 7101 are located on pole 7068 on a nonconductive sleeve 7103 and may also extend around the circumference of pole 7068. A wire 7105 is conductively connected to elements extends 7099, 7101 and extends within pole 7068 to an upper portion of pole 7068 to provide power to devices mounted on umbrella portion 7059 (FIG. 23). When pole 7068 is inserted into aperture 7091 and lowered to its nominal position, electrical contact occurs between elements 7093 and 7099 and between elements 7095 and 7101, allowing power to flow between module 7001 and wire 7105. By making at least one set of elements 7093, 7095 or 7099, 7101 circumferential, a particular angular orientation of pole 7068 relative to spacer 7089 is not required, allowing umbrella portion 7059 to be rotated as desired. An advantage of this embodiment is that umbrella portion 7059 may be removed by simply pulling pole 7068 from within spacer 7089 without unplugging any wires.

Figure 26:
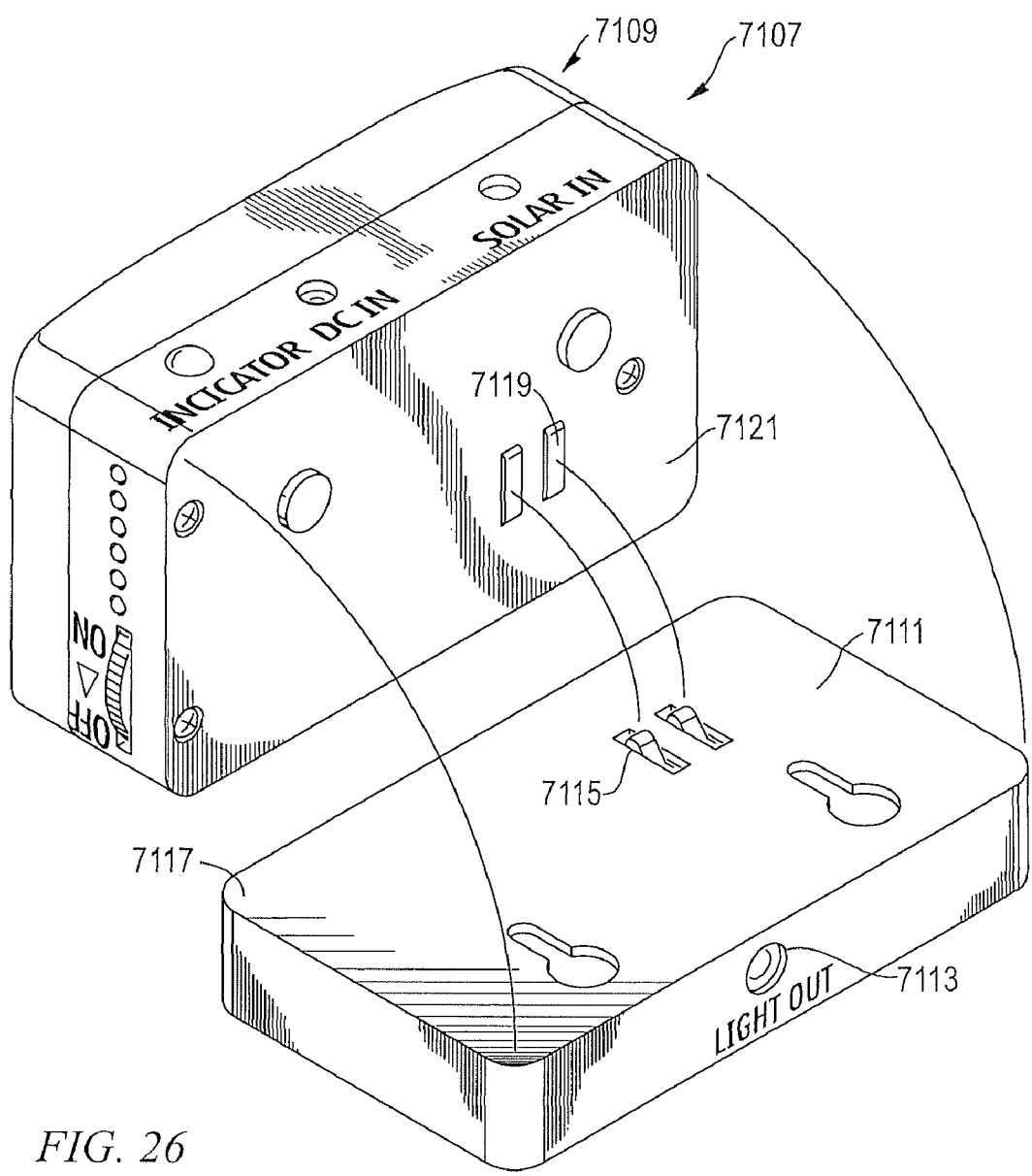
FIG. 26 is an exploded perspective view of a second embodiment of a battery module according to the invention and showing the battery pack disassembled from a mounting bracket having an electrical outlet port.

An alternate embodiment of a battery module for the umbrella apparatus is shown in FIG. 26. Battery module 7107 comprises rechargeable battery pack 7109 and mounting bracket 7111. Battery module 7107 is similar in construction to battery module 7001 (FIG. 18), except that the LIGHT OUT connector 7113 is located on mounting bracket 7111, rather than on battery pack 7109. A set of conductive tabs 7115 are located in surface 7117 of bracket 7111, and tabs 7115 are conductively connected to LIGHT OUT connector 7113. When battery pack 7109 is attached to mounting bracket 7111, tabs 7115 conductively engage elements 7119 on surface 7121 of pack 7109 for allowing power to flow between battery pack 7109 and connector 7113. This permits the user to detach battery pack 7109 without having to unplug a wire from connector 7113, which is an advantage when battery module 7107 is located high above the user under the canopy of umbrella portion 7059.

Figure 27:
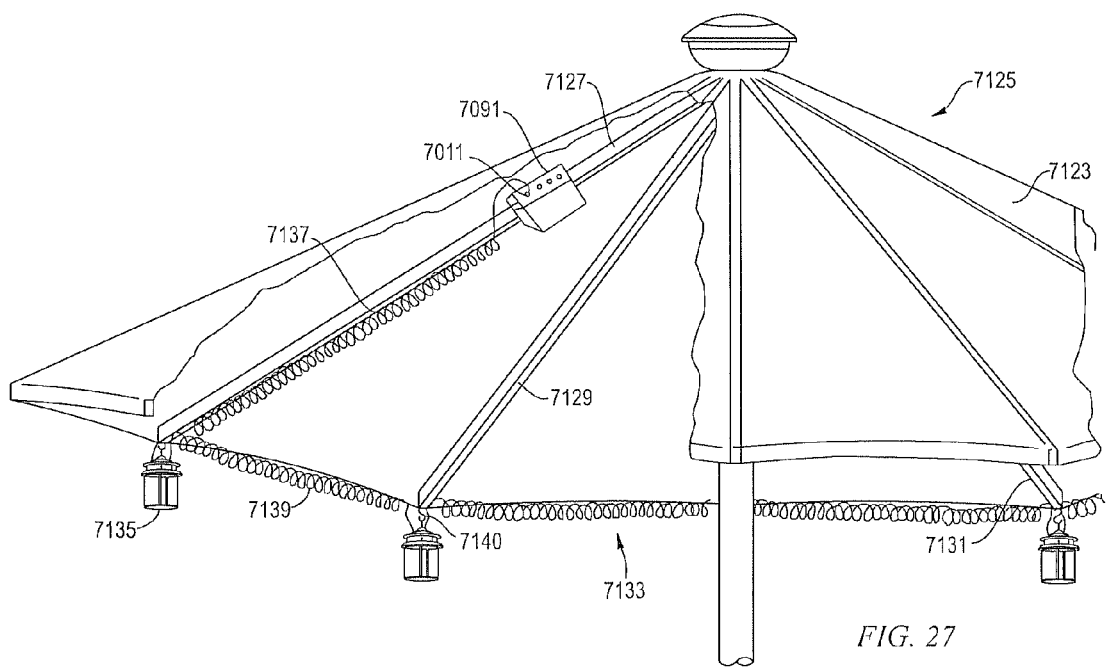
FIG. 27 is a perspective view showing a lighting system according to the invention, wherein a battery module is mounted on a support rib of an umbrella apparatus and connected to a strand of lights connected in a series arrangement, each light being affixed to a peripheral portion of a canopy of the umbrella apparatus.
Figure 28:
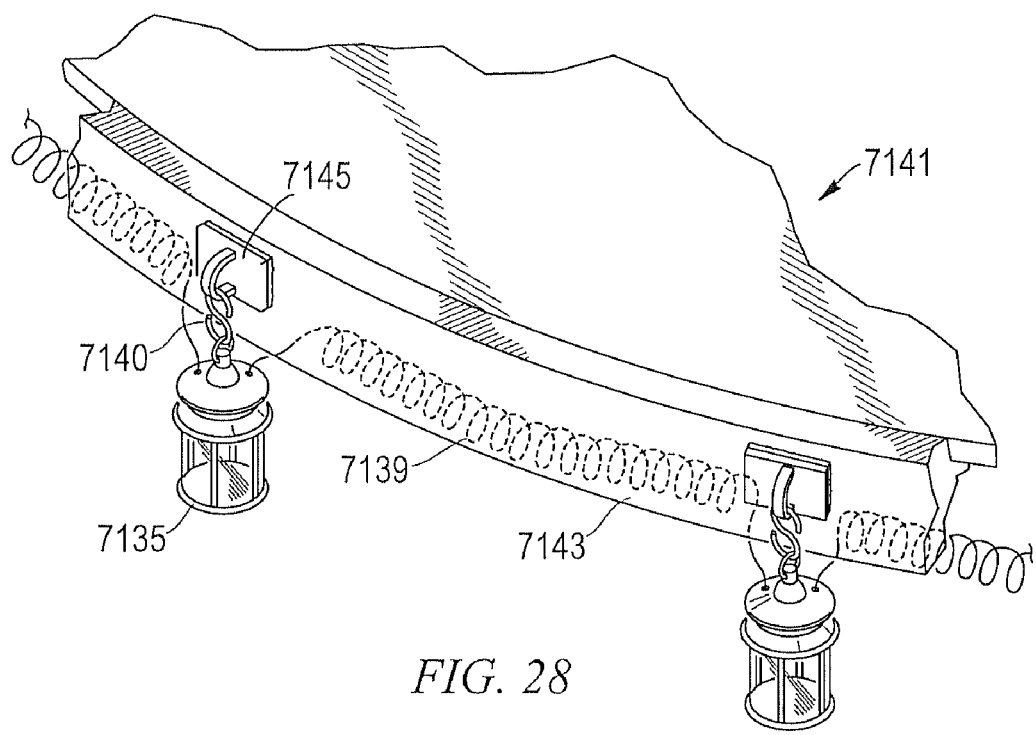
FIG. 28 is a perspective view of a strand of lights mounted according to the invention to a peripheral portion of a table of an umbrella apparatus.
Figure 29:
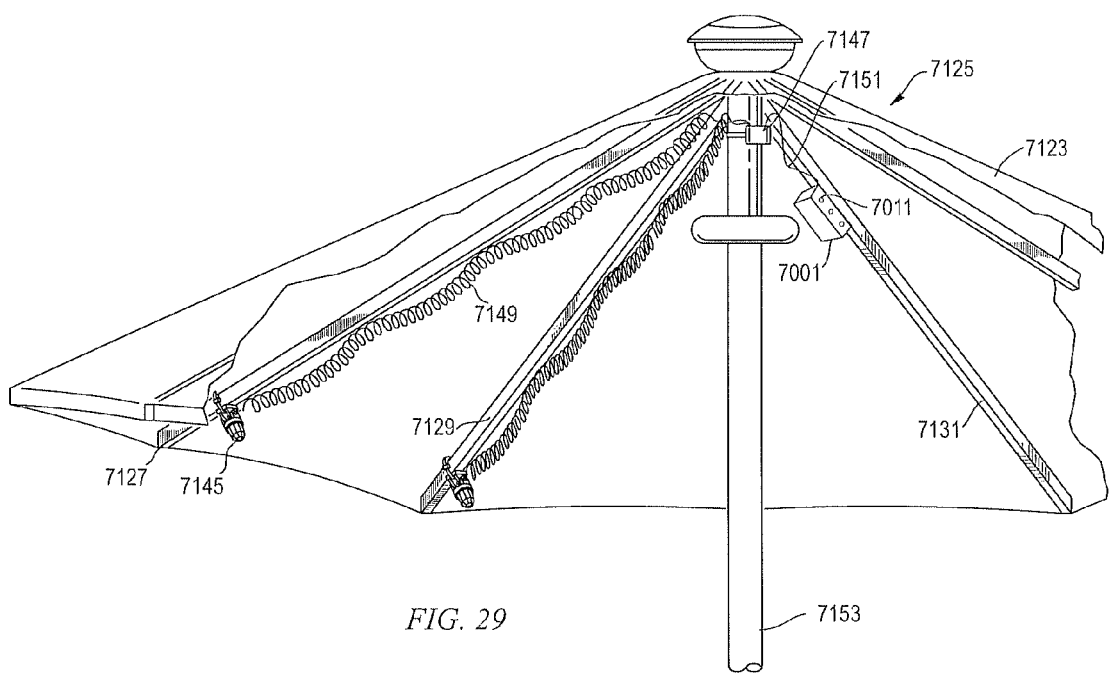
FIG. 29 is a perspective view of a lighting system according to the invention, wherein a battery module is mounted on a support rib of an umbrella apparatus and connected to an electrical hub for providing power to lights connected to the hub in a parallel arrangement, each light being affixed to a peripheral portion of a canopy of the umbrella apparatus.

Lights or other electrical devices, such as misters or fans, may be mounted on an umbrella apparatus of the invention in multiple configurations, two of which are shown in FIGS. 27 through 29. Battery module 7001 is shown in FIG. 27 mounted in a location under canopy 7123 of umbrella 7125 and along rib 7125, though module 7001 or additional modules 7001 may be affixed to any rib, such as ribs 7127, 7129, 7131. A light strand 7133 comprising a plurality of lights 7135 is conductively connected to the LIGHT OUT connector 7011 of battery module 7001. Conductive wire 7137, which may be coiled as shown, extends outward along rib 7125 from module 7001 to a first light 7135. Successive lengths of a preferably coiled wire 7139 conductively connects subsequent lights 7135 in a series configuration, each light 7135 being mounted near the peripheral ends of ribs 7127, 7129, 7131. Using coiled wires 7139 to connect lights 7135 allows for wires 7139 to extend or contract as umbrella 7125 is opened or closed, preventing tangling or damage to wires 7139. Lights 7135 may be of the hanging type shown in FIG. 27, in which lights are mounted using hooks 7140, or may be of other types disclosed herein. Though shown as extending along only a portion of the periphery of canopy 7123, light strand 7133 may extend around the entire peripheral edge of canopy 7123. As described above, a strand of lights 7135 and battery module 7001 may be pre-installed as part of an umbrella apparatus or may be sold separately as a kit to be installed by a user.

A similar series arrangement for lights 7135 is shown in FIG. 28, in which lights 7135 are mounted to a peripheral edge of table 7141. Each light 7135 is attached to a circumferential vertical surface 7143 with a hook 7140 and a bracket 7145, and each wire 7139 is hidden from view under table 7141. Alternatively, lights 7135 may be attached on an inside vertical surface, or lights may be suspended from the horizontal underside of table 7141. This configuration would be particularly suited to a battery module being located in a position beneath table 7141, as shown in FIG. 23.

FIG. 29 illustrates a configuration in which lights 7145 are conductively connected to battery module 7001 in a parallel arrangement. Each light 7145 is attached on a peripheral end portion of one of ribs 7127, 7129 of umbrella 7125 under canopy 7123 and is conductively connected to a central electrical hub 7147 by a wire 7149. To provide power to operate lights 7145, a battery module 7001 is mounted on rib 7131 and conductively connected to hub 7147 with wire 7151, which is plugged into LIGHT OUT connector 7011.

Figure 30:
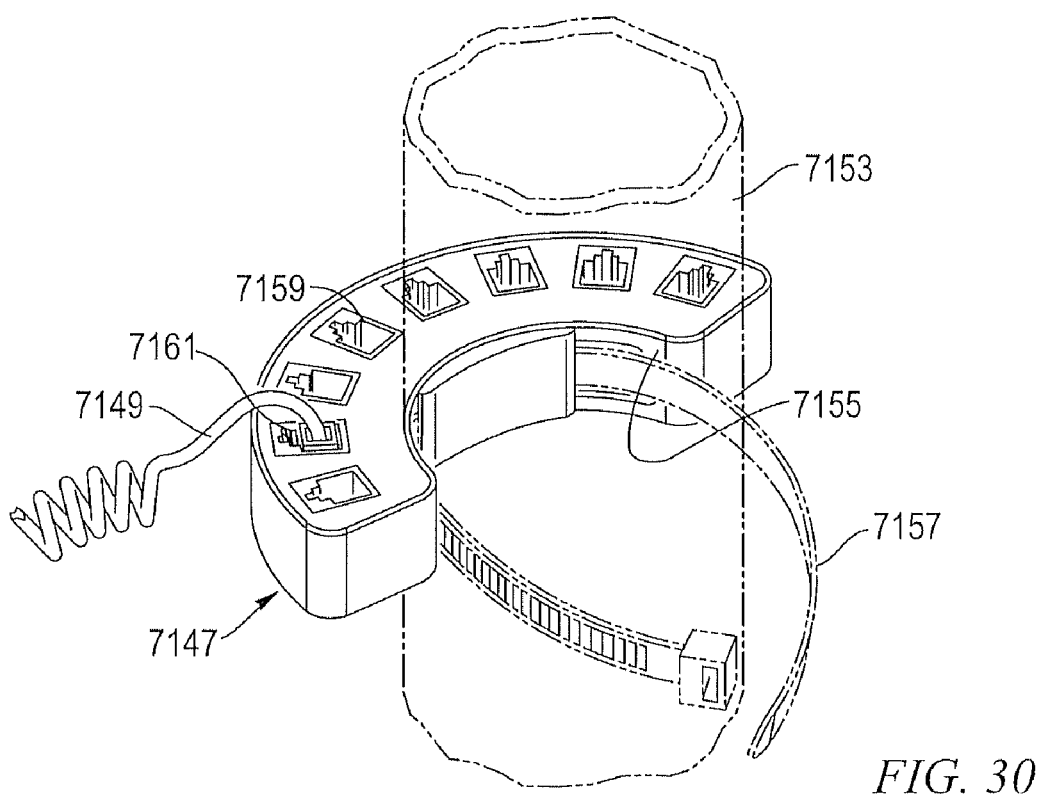
FIG. 30 is an enlarged perspective view of the hub shown in FIG. 29 and according to the invention.

Hub 7147 is mounted on central pole 7153, and is shown in detail in FIG. 30. Hub is formed to have a "half-moon" shape, in which a central cylindrical surface 7155 is sized to receive pole 7153 for placement of hub 7147 adjacent pole 7153. The semi-circular shape of hub 7147 allows hub 7147 to be positioned on pole 7153 in a location that prevents interference with a system used to open and close umbrella 7125, which may include wires and/or pulleys located on an upper portion of pole 7153. A wire tie 7157 or similar fastener extends through a slot in hub 7147 for securing hub 7147 to pole 7153, though other methods of fastening hub 7147 to pole 7153 may be used, for example, adhesives. Hub 7147 comprises multiple female connectors 7159 for receiving male connectors 7161, such as the modular connector shown at the inner end of wire 7149. Female connectors 7159 are conductively connected to each other, such that wire 7151 (FIG. 29) connected to battery module 7001 may be plugged into any one of female connectors 7159 for providing power through wires 7149 plugged into any other female connector 7159. An advantage of hub 7147 is that it allows multiple devices to be powered from one battery module 7001, including multiple types of devices or multiple strands of lights, such as those shown in FIGS. 27 and 28.

Although the invention has been described with reference to a particular embodiment, this description is not meant to be construed in a limiting sense. Various modifications of the disclosed embodiments as well as alternative embodiments of the invention will become apparent to persons skilled in the art upon reference to the description of the invention. For example, the electrical power systems described above may provide power to electrical devices providing functions one or more systems, including a lighting system, a cooling system, a motorized actuation system, a heating system, an audio system, a video system, and an infrared system. It is therefore contemplated that the appended claims will cover any such modifications or embodiments that fall within the scope of the invention.

I claim:

1. An umbrella apparatus comprising:
   a base member adapted to support the umbrella apparatus;
   a pole portion coupled to the base member, the pole portion having a hollow interior;
   a canopy portion hingedly coupled to the pole portion;
   a power module carried by the pole portion above the canopy portion, the power module having an upper portion and a lower portion;
   a rechargeable electrical power system for providing electrical power to the umbrella apparatus, the rechargeable electrical power system being disposed in the lower portion of the power module;
   a solar energy system carried by the upper portion of the power module, the solar energy system being adapted to collect solar energy and convert the solar energy into electrical energy, the solar energy system being conductively coupled to the rechargeable electrical power system, such that the solar energy collected and converted into electrical energy recharges the rechargeable electrical power system;
   a lighting system carried by the canopy portion, the lighting system being conductively coupled to and powered by the rechargeable electrical power system; and
   an electrical opening and closing system for actuating the canopy between the opened position and the closed position, the opening and closing system being conductively coupled to the rechargeable electrical power system via a conductor and being powered by the rechargeable electrical power system, the opening and closing system being carried at an uppermost portion of the pole portion, the opening and closing system comprising:
      an electrical motor positioned within the hollow interior of the pole portion and conductively coupled to the rechargeable electrical power system;
      a transmission operably positioned within the hollow interior and operably associated with the motor;
      a line winding shaft rotatably coupled to the transmission, the line winding shaft extending parallel with respect to a longitudinal length of the pole, the line winding shaft being positioned within the hollow interior;
      a pulley system attached to an exterior surface of the pole portion, the pulley system being attached alongside the line winding shaft; and
      a cable system operably associated with the line winding shaft and the pulley system;
   wherein the solar energy system is configured so that the degree of exposure of the solar energy system remains the same regardless of whether the canopy is in the opened position or in the closed position; and
   wherein the umbrella apparatus is adapted to remain in the outdoor location for recharging the rechargeable electrical power system during daylight hours, regardless of whether the canopy is in the opened position or the closed position, and can remain in the outdoor location after daylight hours.

2. The umbrella apparatus according to claim 1, the opening and closing system further comprising:
   a switch for activating the opening and closing system.

3. The umbrella apparatus according to claim 2, further comprising:
   a crank housing for housing a manual crank assembly for manually actuating the opening and closing system between the opened position and the closed position;
   wherein a switch is disposed on the crank housing.

4. The umbrella apparatus according to claim 2, wherein a switch is disposed on the pole portion.

5. The umbrella apparatus according to claim 1, further comprising:
   a receiver carried by the umbrella apparatus;
   a wireless transmitter for transmitting signals to the receiver;
   wherein the opening and closing system is actuated in response to the signals from the transmitter.

6. The umbrella apparatus according to claim 1, wherein the rechargeable electrical power system and the solar energy system are both carried by a single housing releasably mounted on the pole portion above the canopy.

7. The umbrella apparatus according to claim 1, further comprising:
   an electrical charging system for recharging the rechargeable electrical power system, the electrical charging system being adapted to receive power from an AC power outlet.

8. The umbrella apparatus according to claim 1, wherein the solar energy system is conductively coupled to the rechargeable electrical power system by a releasable plug, such that the solar energy system is removable from the umbrella apparatus.

9. An umbrella apparatus comprising:
   a base member adapted to support the umbrella apparatus;
   a pole portion coupled to the base member, the pole portion having a hollow interior;
   a canopy portion hingedly coupled to the pole portion, the canopy portion having a plurality of radially extending rib members;
   a power module carried by the pole portion above the canopy portion, the power module having an upper portion and a lower portion;
   a rechargeable electrical power system for providing electrical power to the umbrella apparatus, the rechargeable electrical power system being disposed in the lower portion of the power module;
   a solar energy system carried by the upper portion of the power module, the solar energy system being adapted to collect solar energy and convert the solar energy into electrical energy, the solar energy system being conductively coupled to the rechargeable electrical power system, such that the solar energy collected and converted into electrical energy recharges the rechargeable electrical power system;
   a lighting system having a plurality of light emitting diodes conductively coupled to the rechargeable electrical power system, the light emitting diodes being recessed within the rib members; and
   an electrical opening and closing system for actuating the canopy between the opened position and the closed position, the opening and closing system being conductively coupled to the rechargeable electrical power system via a conductor and being powered by the rechargeable electrical power system, the electrical opening and closing system comprising:
      an electrical motor positioned within the hollow interior of the pole portion and conductively coupled to the rechargeable electrical power system;
      a transmission operably positioned within the hollow interior and operably associated with the motor;

a line winding shaft rotatably coupled to the transmission, the line winding shaft extending parallel with respect to a longitudinal length of the pole, the line winding shaft being positioned within the hollow interior;

a pulley system attached to an exterior surface of the pole portion, the pulley system being attached alongside the line winding shaft; and a cable system operably associated with the line winding shaft and the pulley system;

wherein the solar energy system is configured so that the degree of exposure of the solar energy system remains the same regardless of whether the canopy is in the opened position or in the closed position; and wherein the umbrella apparatus is adapted to remain in the outdoor location for recharging the rechargeable electrical power system during daylight hours, regardless of whether the canopy is in the opened position or the closed position, and can remain in the outdoor location after daylight hours.

10. The umbrella apparatus according to claim 9, further comprising:

a crank housing for housing a manual crank assembly for manually actuating the opening and closing system between the opened position and the closed position;

wherein a switch is disposed on the crank housing.

11. The umbrella apparatus according to claim 9, further comprising:

a receiver carried by the umbrella apparatus; and a wireless transmitter for transmitting signals to the receiver;

wherein the opening and closing system is actuated in response to the signals from the transmitter.

* * * * *